United States Patent
Choi et al.

(10) Patent No.: US 10,044,215 B2
(45) Date of Patent: Aug. 7, 2018

(54) METHOD, APPARATUS, AND SERVER FOR UPDATING SOFTWARE

(71) Applicant: Samsung Electronics Co., Ltd., Gyeonggi-do (KR)

(72) Inventors: Bokun Choi, Seoul (KR); Doosuk Kang, Gyeonggi-do (KR); Geonsoo Kim, Gyeonggi-do (KR); Donghyun Yeom, Gyeonggi-do (KR); Piljoo Yoon, Gyeonggi-do (KR); Yongjoon Jeon, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 160 days.

(21) Appl. No.: 14/851,916

(22) Filed: Sep. 11, 2015

(65) Prior Publication Data

US 2016/0079802 A1    Mar. 17, 2016

(30) Foreign Application Priority Data

Sep. 11, 2014    (KR) ........................ 10-2014-0120070

(51) Int. Cl.
   *H02J 7/00*    (2006.01)
   *H02J 7/02*    (2016.01)
   *H02J 50/10*    (2016.01)
   *H02J 50/80*    (2016.01)

(52) U.S. Cl.
   CPC ............. *H02J 7/025* (2013.01); *H02J 50/10* (2016.02); *H02J 50/80* (2016.02)

(58) Field of Classification Search
   USPC ................ 320/108; 455/419–420, 41.1, 41.2
   See application file for complete search history.

(56) References Cited

U.S. PATENT DOCUMENTS

| | | | |
|---|---|---|---|
| 8,092,251 B2 | 1/2012 | Rosenblatt | |
| 8,376,776 B2 | 2/2013 | Rosenblatt | |
| 9,301,164 B2 * | 3/2016 | Lin | G06F 8/654 |
| 2007/0169105 A1 | 7/2007 | Amberny et al. | |
| 2012/0079100 A1 * | 3/2012 | McIntyre | G06F 11/0742 709/224 |
| 2012/0214418 A1 * | 8/2012 | Lee | G06F 1/3209 455/41.2 |
| 2012/0279877 A1 | 11/2012 | Janis et al. | |
| 2012/0296686 A1 | 11/2012 | Fugman et al. | |
| 2012/0296777 A1 | 11/2012 | Fugman et al. | |
| 2013/0086373 A1 | 4/2013 | Rothkopf et al. | |
| 2015/0281873 A1 * | 10/2015 | Ojala | H04W 4/008 455/41.2 |

FOREIGN PATENT DOCUMENTS

| | | |
|---|---|---|
| JP | 2004-222209 | 8/2004 |
| JP | 2007-159120 | 6/2007 |

* cited by examiner

*Primary Examiner* — Nghia Doan
(74) *Attorney, Agent, or Firm* — The Farrell Law Firm, P.C.

(57) ABSTRACT

An electronic device, wireless control device, system management server, wireless control method, and an update method are provided. The electronic device includes a wireless charging module configured to receive a request signal from a wireless control device and transmit a response signal to the wireless control device in response to the request signal; and a processor configured to update system software of the electronic device based on a management mode booting signal that is received from the wireless control device in response to the request signal.

11 Claims, 22 Drawing Sheets

FIG. 6C

| ID | IMEI | Model | AP Binary Version | CP Binary Version | Update Check | Binary ready? | Charging |
|---|---|---|---|---|---|---|---|
| 1 | 124523584539221 | A7372G | 1.6 | 1.6 | ○ | ○ | 9 |
| 2 | 325125456852456 | A777AF | 2.5 | 2.5 | ○ | ○ | 9 |
| 3 | 245698532147555 | SG2750 | 3.0 | 3.0 | ○ | ○ | 9 |
| 4 | 125478965523214 | GG8563 | 4.0 | 4.0 | ○ | × | 9 |
| 5 | 458965852123456 | SS5486 | 4.0 | 4.0 | ○ | × | 9 |
| 6 | 654741258963456 | A777AF | 2.5 | 2.5 | ○ | ○ | 9 |
| 7 | 753951456852159 | A777AF | 2.5 | 2.5 | ○ | × | 1 |
| 8 | 963258741258963 | GG8563 | 3.0 | 3.0 | ○ | ○ | 3 |
| 9 | 321456987456321 | A777AF | 1.5 | 1.5 | | | 2 |
| 10 | 745632145698741 | GG8563 | | | | | 4 |
| 11 | 976413515395574 | A7372G | | | | | 5 |

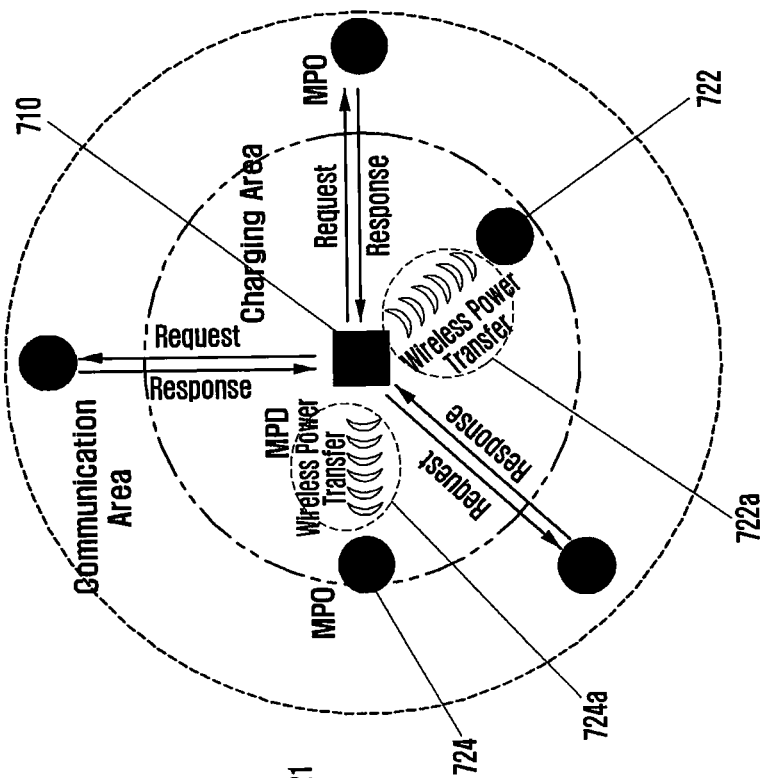
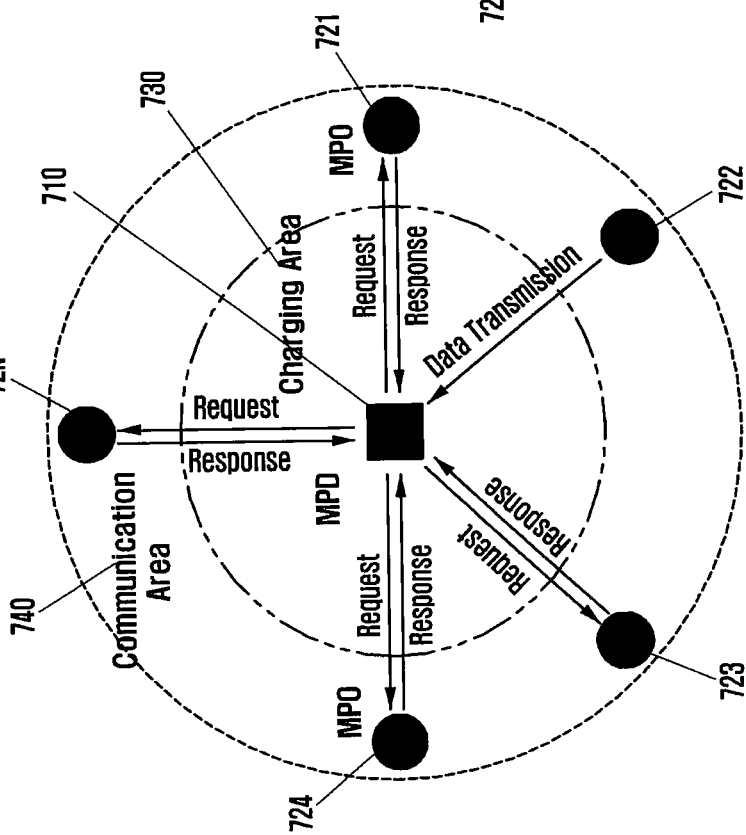
FIG. 7A
FIG. 7B

FIG. 8D

Unit : Byte

| 2 | 1 | L |
|---|---|---|
| Node ID | Slot number | Data |

Slot number — 840
Data — 850

METHOD, APPARATUS, AND SERVER FOR UPDATING SOFTWARE

PRIORITY

This application claims priority under 35 U.S.C. § 119(a) to a Korean Patent Application filed on Sep. 11, 2014 in the Korean intellectual Property Office and assigned Serial No. 10-2014-0120070, the entire disclosure of which is incorporated herein by reference.

BACKGROUND

1. Field of the Disclosure

The present disclosure relates generally to systems for controlling electronic devices wirelessly, efficiently, and more particularly, to a wireless control method that charges a battery of an electronic device or updates software of an electronic device, without the need to open the electronic device.

2. Description of the Related Art

With the rapid development of information and communication technology and semiconductor technology, the use of various types of electronic devices has increased. Electronic devices as initial models have provided primary services such as a voice call, text message transmission, etc. In recent years, electronic devices, such as laptop computers, etc., have provided a variety of services through the wireless Internet, e.g., mobile communication, short-range wireless communication, broadcast receiving. Internet access, etc.

Electronic devices are frequently updated to add new functions or fix bugs. According to conventional updating methods, electronic devices have been updated as the users directly execute an updating process or collectively by the manufacturers during manufacture. In order to update software of an electronic device, a user must take the electronic device out of its packaging and directly handle the electronic device with the user's hands or connect a communication line to the electronic device.

When a user purchases a new electronic device, the user must perform an update process for the electronic device one or more times. These frequent updates inconvenience the user so that the user cannot use the electronic device immediately after purchasing it. In addition, when a bug is detected on an electronic device during manufacture, the electronic device must be removed from its packaging; directly connected to a connector to install a binary file for fixing the bug; and re-packaged for sale, which completes the manufacturing process. That is, a series of processes during manufacture of an electronic device, i.e., unpacking, installing a binary file, and re-packaging, require human contact to complete, which decreases manufacturing efficiency and increases manufacturing cost.

From a point of view of supply chain management (SCM), sales management and inventory management of electronic devices is important. However, according to the current distribution channel structure of electronic devices, it is difficult for electronic device manufacturers to determine how many of an electronic device has actually been sold. This is because a distribution channel has been established so that manufacturers aggregate only the number of electronic devices that have been sold to mobile communication service providing companies but have difficulty in obtaining information on how many electronic devices the mobile communication service providing companies have sold to end users.

SUMMARY

An aspect of the present disclosure provides a wireless control method that charges a battery of an electronic device or updates software of an electronic device, without unpacking the electronic device. The present disclosure further provides a server and an apparatus adapted to the wireless control method.

In accordance with an aspect of the present disclosure, an electronic device is provided. The electronic device includes a wireless charging module configured to receive a request signal from a wireless control device and transmit a response signal to the wireless control device in response to the request signal; and a processor configured to update system software of the electronic device based on a management mode booting signal that is received from the wireless control device in response to the request signal.

In accordance with another aspect of the present disclosure, a wireless control device is provided. The wireless control device includes a wireless charging module configured to broadcast a request signal over a preset area, receiving a response signal from an electronic device in response to the request signal, and control charging a battery of the electronic device based on the response signal; and a control module configured to determine whether to boot the electronic device in a management mode or whether to charge the battery, based on the response signal.

In accordance with another aspect of the present disclosure, a system management server is provided. The system management server includes a database configured to store device information about electronic devices and system update files by system versions; a controller configured to compare a system version contained in device information about an electronic device, received through a wireless control device, with a recent system version stored in the database; and a communication unit configured to transmit a system update file to the electronic device, based on a result of the comparison.

In accordance with another aspect of the present disclosure, a wireless control method of an electronic device is provided. The wireless control method of an electronic device includes receiving a request signal from a wireless control device; transmitting a response signal to the wireless control device in response to the request signal; and updating system software of the electronic device based on a management mode booting signal that is received from the wireless control device in response to the request signal.

In accordance with another aspect of the present disclosure, a wireless control method of a wireless control device is provided. The wireless control method of a wireless control device includes broadcasting a request signal over a preset area; receiving a response signal from an electronic device in response to the request signal; and determining whether to boot the electronic device in a management mode or whether to charge a battery, based on the response signal.

In accordance with another aspect of the present disclosure, an update method of a system management server is provided. The update method of a system management server includes storing device information about electronic devices and system update files by system versions in a database; receiving device information from an electronic device through a wireless control device; comparing a system version contained in the received device information with a recent system version stored in the database; and transmitting a system update file to the electronic device, based on a result of the comparison.

BRIEF DESCRIPTION OF THE DRAWINGS

The above and other aspects, features, and advantages of the present disclosure will become more apparent from the following detailed description, in conjunction with the accompanying drawings, in which:

FIG. 6C is a database of a system management server according to an embodiment of the present disclosure;

FIGS. 7A and 7B are diagrams of a network for performing a wireless charging process according to an embodiment of the present disclosure;

FIGS. 8A to 8D are diagrams of data transfer frames according to embodiments of the present disclosure.

DETAILED DESCRIPTION OF EMBODIMENTS OF THE PRESENT DISCLOSURE

Figure 1:
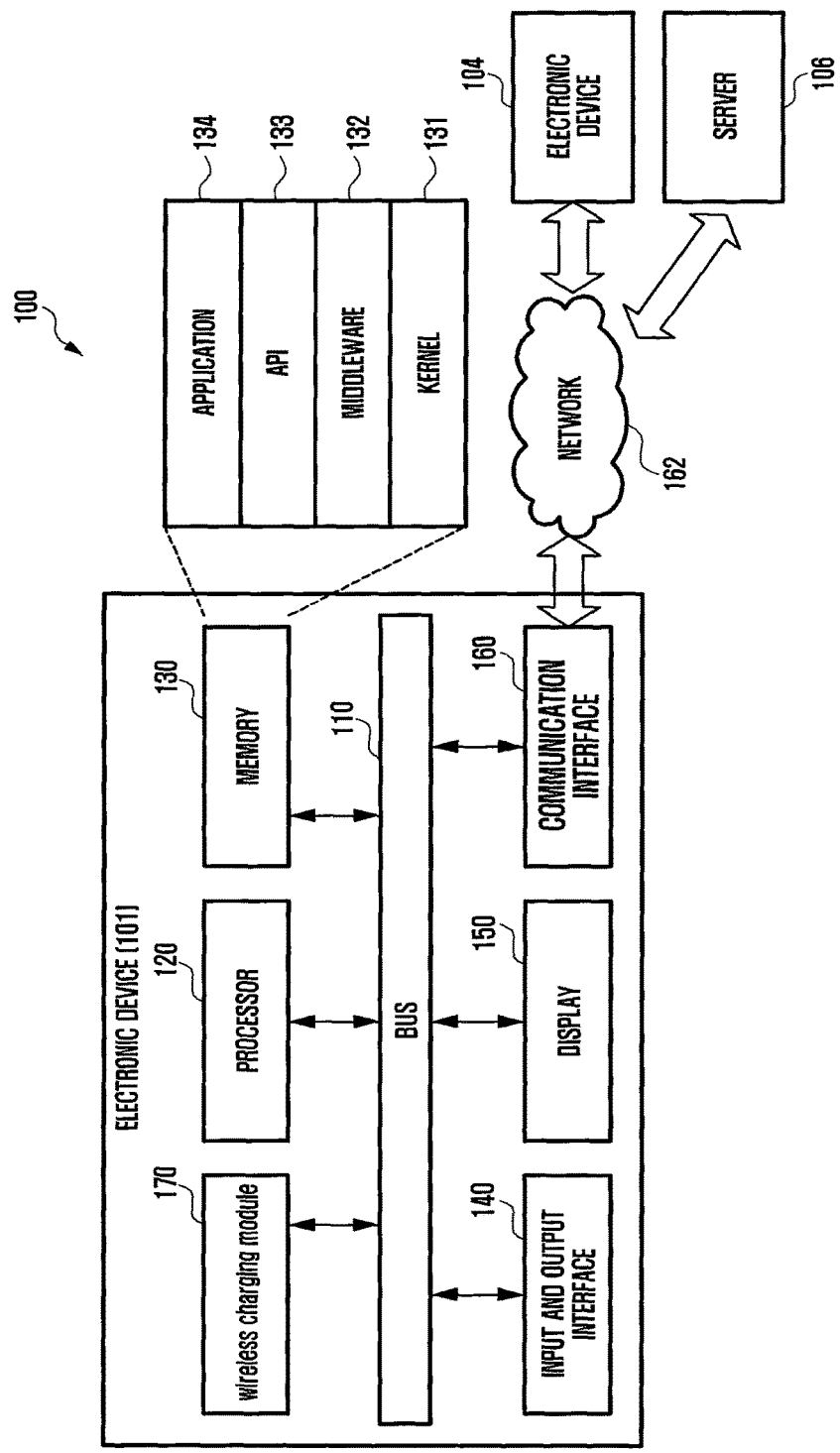
FIG. 1 is a block diagram of a network environment including an electronic device according to an embodiment of the present disclosure.

Hereinafter, various embodiments are described in detail with reference to the accompanying drawings. It should be understood that the same reference numbers are used throughout the accompanying drawings to refer to the same or similar parts. Detailed descriptions of well-known functions and structures incorporated herein may be omitted to avoid obscuring the subject matter of the present disclosure. In the following description, it should be understood that functions, operations and configurations according to various embodiment of the present disclosure will be described in detail; however a detailed description of known functions, operations and configurations will be omitted when it may make the subject matter of the disclosure less clear.

The expressions such as "include" and "may include" which may be used in the present disclosure indicate the presence of the disclosed functions, operations, and constituent elements and do not limit one or more additional functions, operations, and constituent elements. In the present disclosure, terms such as "include" and/or "have" may be construed to refer to a certain characteristic, number, step, operation, constituent element, component or a combination thereof, but are not to be construed to exclude the existence of or a possibility of addition of one or more other characteristics, numbers, steps, operations, constituent elements, components or combinations thereof.

Furthermore, in the present disclosure, the expression "and/or" includes any and all combinations of the associated listed words. For example, the expression "A and/or B" may include A, B, or both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely to distinguish an element from another element. For example, a first user device and a second user device indicate different user devices although both of them are user devices. For example, a first element may be referred to as a second element, and similarly, a second element may be referred to as a first element without departing from the scope and spirit of the present disclosure.

In a case where a component is referred to as being "connected to" or "accessed by" another component, it should be understood that not only the component is directly connected or accessed to the other component, but also there may exist another component between them. Meanwhile, in the case where a component is referred to as being "directly connected to" or "directly accessed by" another component, it should be understood that there is no component therebetween.

The terms used in the present disclosure are only used to describe certain embodiments of the present disclosure, and are not intended to limit the present disclosure. As used herein, singular forms are intended to include plural forms as well, unless the context clearly indicates otherwise.

Unless otherwise defined, all terms including technical and/or scientific terms used herein have the same meanings as commonly understood by one of ordinary skill in the art to which the invention pertains. In addition, unless otherwise defined, all terms defined in generally used dictionaries should not be overly interpreted.

An electronic device according to the present disclosure may be a device with a communication function. For example, an electronic device may be a smart phone, a tablet personal computer (PC), a mobile phone, a video phone, an electronic book (e-book) reader, a desktop PC, a laptop PC, a netbook computer, a personal digital assistant (PDA), a portable multimedia player (PMP), a moving picture experts group audio layer 3 (MP3) player, a portable medical device, a digital camera, or a wearable device (e.g., a head-mounted device (HMD) such as electronic glasses, electronic clothes, an electronic bracelet, an electronic necklace, an electronic appcessory, or a smart watch).

According to an embodiment of the present disclosure, the electronic device may be a smart home appliance with a communication function. The smart home appliance, for example, may be a TV, a digital video disk (DVD) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame.

According to an embodiment of the present disclosure, an electronic device may be a medical device (e.g., a magnetic resonance angiography (MRA) device, a magnetic resonance imaging (MRI) device, a computed tomography (CT) device, an ultrasonography device, etc.), a navigation device, a global positioning system (GPS) receiver, an event data recorder (EDR), a flight data recorder (FDR), a car infotainment device, electronic equipment for a ship (e.g., a marine navigation system, a gyrocompass, etc.), avionics, security equipment, or a head unit for a vehicle, an industrial or home robot, an automatic teller machine (ATM), a point of sale (POS) system, etc.

According to an embodiment of the present disclosure, an electronic device may be furniture or part of a building or a construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. In addition, the electronic device according to the present disclosure may be a flexible device. It is obvious to those skilled in the art that the electronic device according to the present disclosure is not limited to the devices listed above.

Hereinafter, an electronic device according an embodiment of the present disclosure is described in detail with reference to the accompanying drawings. In the following description, the term "user" may be referred to as a person or a device that uses an electronic device, e.g., an artificial intelligence electronic device.

FIG. 1 is a block diagram of a network environment 100 including therein an electronic device 101 in accordance with an embodiment of the present disclosure.

Referring to FIG. 1, the electronic device 101 may include a bus 110, a processor 120, a memory 130, an input/output interface 140, a display 150, a communication interface 160 and a wireless charging module 170.

The bus 110 may be a communication circuit that connects the components to each other and transfers signals (e.g., control messages) between the components.

The processor 120 may receive commands from the other elements (e.g., the memory 130, the input/output interface 140, the display 150, the communication interface 160, or the wireless charging module 170, etc.) through the bus 110, interpret the received commands, and perform arithmetic or process data based on the interpreted commands.

The memory 130 may store therein commands or data received from or created by the processor 120 or other elements (e.g., the input/output interface 140, the display 150, the communication interface 160, or the wireless charging module 170, etc.). The memory 130 may include programming modules such as a kernel 131, a middleware 132, an application programming interface (API) 133, and an application 134. Each of the programming modules may be software, firmware, hardware, or any combination thereof.

The kernel 131 may control or manage system resources (e.g., the bus 110, the processor 120, or the memory 130, etc.) used for performing operations or functions of the other programming modules, e.g., the middleware 132, the API 133, or the application 134. Additionally, the kernel 131 may provide an interface that allows the middleware 132, the API 133 or the application 134 to access, control or manage individual elements of the electronic device 101.

The middleware 132 may perform intermediation by which the API 133 or the application 134 communicates with the kernel 131 to transmit or receive data. Additionally, in connection with task requests received from the application 134, the middleware 132 may perform a control (e.g., scheduling or load balancing) for the task request by using a technique such as assigning a priority for using a system resource of the electronic device 101 (e.g., the bus 110, the processor 120, or the memory 130, etc.) to at least one of the application 134.

The API 133, which is an interface for allowing the application 134 to control a function provided by the kernel 131 or the middleware 132, may include, for example, at least one interface or function (e.g., a command) for file control, window control, image processing, text control, and the like.

According to an embodiment of the present disclosure, the application 134 may include a short message service/multimedia messaging service (SMS/MMS) application, an email application, a calendar application, an alarm application, a health care application (e.g., an application for measuring a quantity of motion or blood sugar level), an environmental information application (e.g., an application for offering information about atmospheric pressure, humidity, or temperature, etc.), and the like. Additionally or alternatively, the application 134 may be an application associated with an exchange of information between the electronic device 101 and any external electronic device 104. This type of application may include a notification relay application for delivering information to an external electronic device, or a device management application for managing an external electronic device.

For example, the notification relay application may include a function to deliver notification information created by any other application of the electronic device 101 (e.g., the SMS/MMS application, the email application, the health care application, or the environmental information application, etc.) to an external electronic device 104. Additionally or alternatively, the notification relay application may receive notification information from an external electronic device 104 and offer it to a user. The device management application may manage (e.g., install, remove or update) a certain function (e.g., turn-on/turn-off an external electronic device (or some components thereof), or an adjustment of brightness (or resolution) of a display) of any external electronic device 104 communicating with the electronic device 101, a certain application operating at such an external electronic device, or a certain service (e.g., a call service or a message service) offered by such an external electronic device.

According to an embodiment of the present disclosure, the application 134 may include an application selected based on attributes (e.g., a type) of an external electronic device 104. For example, in a case where an external electronic device is an MP3 player, the application 134 may include an application associated with playing music. Similarly, in a case where an external electronic device is a portable medical device, the application 134 may include an application associated with health care. In an embodiment of the present disclosure, the application 134 may include at least one of an application assigned to the electronic device 101 or an application received from the server 106 or the electronic device 104.

The input/output interface 140 may deliver commands or data, entered by a user through an input/output unit (e.g., a sensor, a keyboard, or a touch screen), to the processor 120, the memory 130, the communication interface 160, or the wireless charging module 170 via the bus 110. For example, the input/output interface 140 may provide data about a user's touch, entered through the touch screen, to the processor 120. Also, through the input/output unit 140 (e.g., a speaker or a display), the input/output interface 140 may output commands or data, received from the processor 120, the memory 130, the communication interface 160, or the wireless charging module 170 via the bus 110. For example, the input/output interface 140 may output voice data, processed through the processor 120, to a user through the speaker.

The display 150 may display thereon various kinds of information (e.g., multimedia data, text data, etc.) to a user.

The communication interface 160 may establish communication between the electronic device 101 and the electronic device 104 of the server 106. For example, the communication interface 160 may communicate with any external device by being connected to a network 162 through a wired or wireless communication. A wireless communication may include, but is not limited to, at least one of wireless fidelity (Wi-Fi), Bluetooth (BT), near field communication (NFC), GPS, or a cellular communication (e.g., long term evolution (LTE), LTE advanced (LTE-A), code division multiple access (CDMA), wideband CDMA (WCDMA), universal mobile telecommunications system (UMTS), wireless broadband (WiBro), or global system for mobile communications (GSM), etc.). A wired communication may include, but is not limited to, at least one of a universal serial bus (USB), a high definition multimedia interface (HDMI), a recommended standard 232 (RS-232), or a plain old telephone service (POTS).

According to an embodiment of the present disclosure, the network 162 may be a communication network, which may include at least one of a computer network, an Internet, an Internet of Things (IoT), or a telephone network. According to an embodiment of the present disclosure, a protocol (e.g., transport layer protocol, data link layer protocol, or physical layer protocol) for a communication between the electronic device 101 and any external device may be supported by at least one of the application 134, the API 133, the middleware 132, the kernel 131, or the communication interface 160.

The wireless charging module 170 may wirelessly receive a request signal from a wireless control device and transmit a response signal to the wireless control device. The request signal may include an identifier of the wireless control device. The response signal may include one or more of a device identifier for identifying the electronic device 101, a remaining battery capacity of the electronic device 101 and status information about the electronic device 101. The status information may include version information (e.g. system version) about software, a condition as to whether a software binary file is abnormal (e.g. its system version does not match the present system version), and a condition as to whether an initialization is performed (e.g. a case where a log is not allowed to remain for a test).

The wireless charging module 170 may include an additional communication module for performing reception of the request signal and transmission of the response signal.

When the remaining battery capacity is less than a pre-determined threshold, the wireless charging module 170 may receive a charging signal from the wireless control device and may charge the battery of the electronic device 101 by using the charging signal. The charging signal may include instructions for informing the electronic device 101 when and how the battery charge is performing. The wireless charging module 170 may further include a control module for controlling the battery charge of the electronic device 101. The control module is, in terms of concept, the same as or similar to the processor 120 of the electronic device 101, and may identify or charge the battery of the electronic device 101 without turning on the electronic device 101.

When the remaining battery capacity is greater than or equal to the pre-determined threshold, the wireless charging module 170 may receive a management mode booting signal from the wireless control device. When the management mode booting signal is received, the wireless charging module 170 may wake up the processor 120 from a low power mode or sleep mode. Since the processor 120 does not wake up while the battery of the electronic device 101 is charged, the wireless charging module 170 may wake up the processor 120 only when an update is needed as the wireless charging module 170 receives the management mode booting signal.

The memory 130 may store device information including at least one of an identification code, a model name, a system version, and hardware information, which are related to the electronic device 101.

The processor 120 may extract device information stored in the memory 130 by booting the electronic device 101 in a management mode through the management booting system. The processor 120 may connect to the wireless control device by using communication connection information included in the management mode booting signal, and may transmit device information to the wireless control device. The communication connection information may be a media access control (MAC) address of an object to receive device information. In this case, the processor 120 may control the communication interface 160 to connect to the wireless control device and to transmit device information thereto.

The communication interface 160 may receive a system update file based on the transmitted device information. The system update file may be a binary full change file of the recent system version. In addition, the system update file may be an update package, or a delta file, which includes only the differences between the system software (e.g., firmware) of the existing system version and that of a new system version. For reference, updating with an update package extracted from the binary full change file is called a firmware over-the-air (FOTA) service.

The processor 120 may update system software of the electronic device 101 by using the system update file. Although the processor 120 transmitted the device information to the wireless control device but has not received an update start signal from the wireless control device within a preset period of time since the transmission, the processor 120 may turn the electronic device 101 off. In addition, when the processor 120 receives a command for supplying power through the input/output interface 140, it may remove the management booting system from the memory 130. For example, when a user first presses a "power on button" to supply power, located on the input/output interface 140, the processor 120 may remove the management booting system from the memory 130.

Figure 2A:
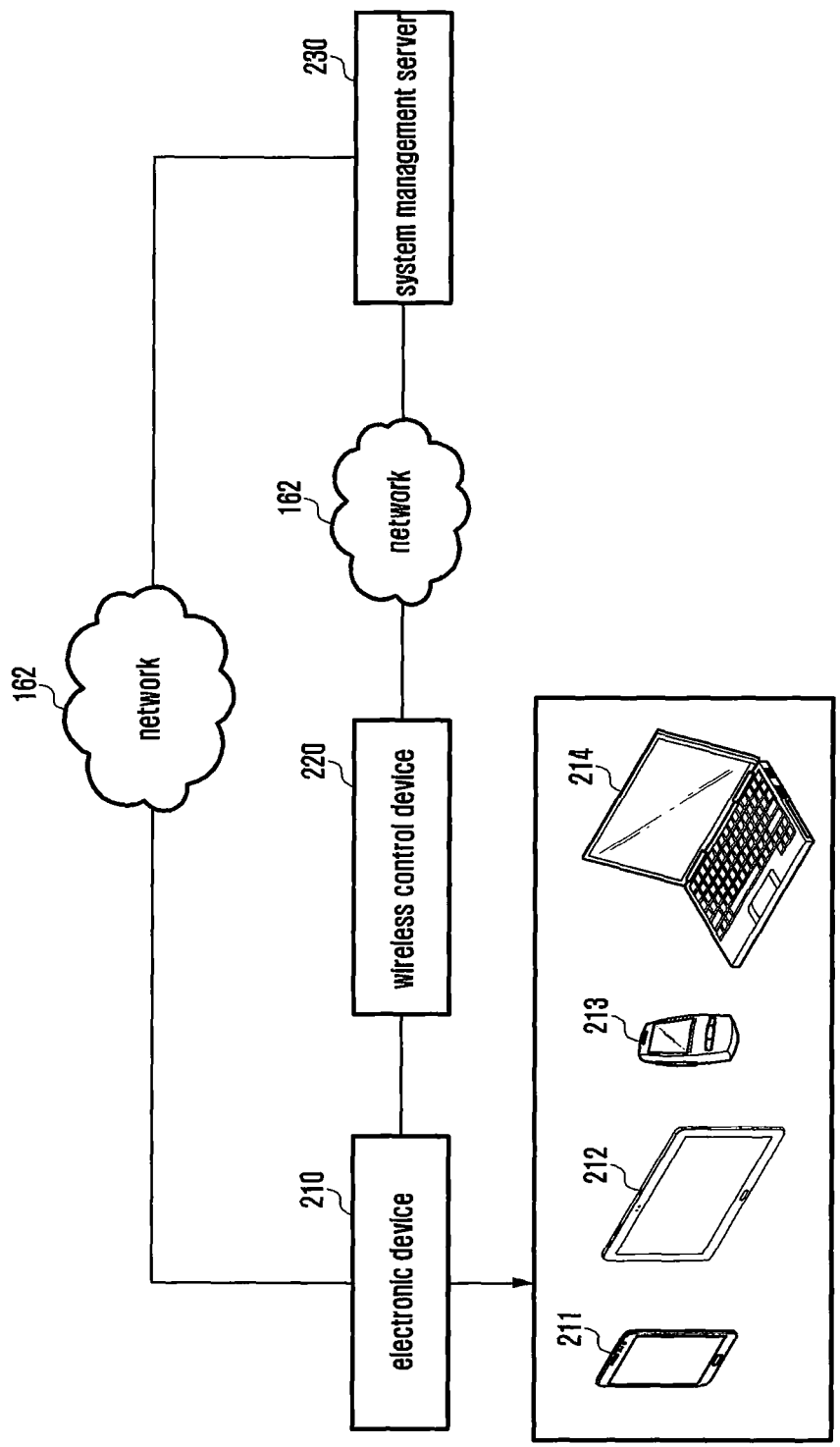
FIG. 2A is a block diagram of a network environment including an electronic device, a wireless control device and a system management server, according to an embodiment of the present disclosure.

FIG. 2A is a block diagram of a network environment including an electronic device, a wireless control device and a system management server, according to an embodiment of the present disclosure.

Referring to FIG. 2A, the electronic device 210 (e.g., electronic device 101 of FIG. 1) may perform wireless charging by establishing a wireless communication with the wireless control device 220. In addition, the electronic device 210 may update system software by communicating with the system management server 230 through the wireless control device 220. Examples of the electronic device 210 are a mobile device 211, a tablet PC 212, an MP3 player 213, a laptop 214, etc. as shown in FIG. 2A.

Figure 2B:
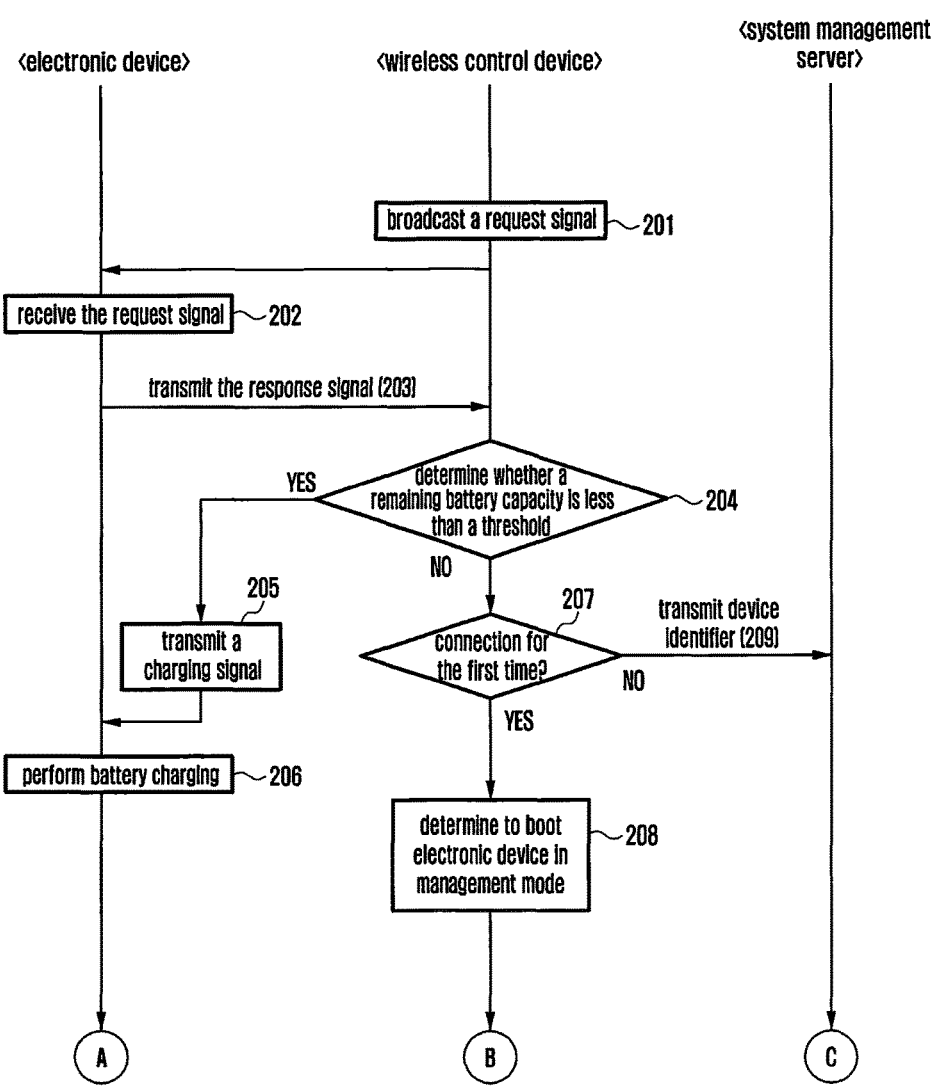
FIG. 2B is a flow diagram of a wireless charging method applied to the network environment of FIG. 2A according to an embodiment of the present disclosure.

FIG. 2B is a flow diagram of a wireless charging method applied to the network environment of FIG. 2A according to an embodiment of the present disclosure.

Referring to FIG. 2B, the wireless control device 220 may broadcast a request signal over a preset area in step 201. The preset area may be a charging area or a communication area. The charging area may refer to a region in which a charging signal is receivable for charging. The communication area may refer to a region in which the request signal is receivable. The radius of the charging area may be less than that of the communication area. The request signal may include an identifier for identifying the wireless control device 220.

The electronic device 210 may receive the request signal from the wireless control device 220 in step 202. The electronic device 210 and the wireless control device 220 may be connected to each other through a first wireless network for wireless charging, such as Zigbee, Bluetooth, etc. The wireless charging module of the electronic device 210 may detect the request signal in real-time.

The electronic device 210 may transmit a response signal to the wireless control device 220, in response to the request signal, in step 203. The response signal may include at least one of a device identifier for identifying the electronic device 210, a remaining battery capacity of the electronic device 210 and status information about the electronic device 210. The device identifier serves to identify the electronic device 210. The device identifier may be an international mobile equipment identity (IMEI) included in the device information, etc. The status information may include version information (e.g. a system version) about software, a condition as to whether a software binary file is abnormal, and a condition as to whether an initialization is performed (e.g. a case where a log is not allowed to remain for a test).

When the wireless control device 220 receives the response signal, it may determine whether the remaining battery capacity is less than a threshold (e.g. a pre-determined threshold) in step 204.

When the remaining battery capacity is less than a threshold in step 204, the wireless control device 220 may transmit a signal for charging the battery to the electronic device 210 in step 205. The charging signal may include instructions for informing the electronic device 210 when and how the battery charge is performing.

When the electronic device 210 receives the charging signal from the wireless control device 220, it may charge the battery using the charging signal in step 206. The wireless charging module of the electronic device 210 may charge the battery in a state where the electronic device 210 is not turned on, according to the instructions.

In contrast, when the remaining battery capacity is greater than or equal to the threshold in step 204, the wireless control device 220 may determine whether the electronic device 210 has transmitted the response signal to, or made a connection with, the wireless control device 220, for the first time, in step 207. When the electronic device 210 has made a connection with the wireless control for the first time in step 207, the wireless control device 220 may determine to boot the electronic device 210 in a management mode in step 208. Booting the electronic device 210 in a management mode refers to a process for turning on the electronic device 210.

In contrast, when the electronic device 210 has not made a connection for the first time in step 207, the wireless control device 220 may transmit the device identifier included in the response signal to the system management server 230 in step 209. When the system management server 230 receives the device identifier, it may determine whether to update the system of the electronic device 210 by using the device identifier.

Figure 2C:
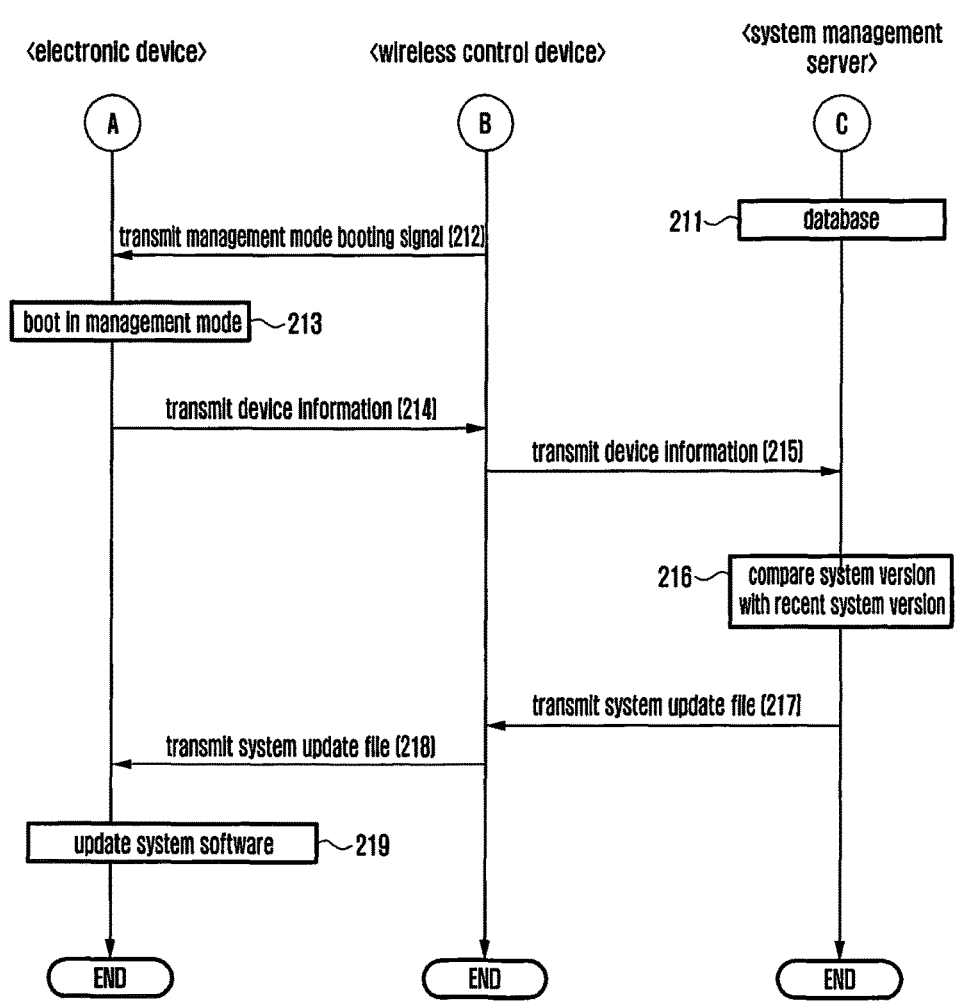
FIG. 2C is a flow diagram of an update method applied to the network environment of FIG. 2A according to an embodiment of the present disclosure.

FIG. 2C is a flow diagram of an update method applied to the network environment of FIG. 2A according to an embodiment of the present disclosure.

Referring to FIG. 2C, the system management server 230 may store device information and system update flies by system versions, related to the electronic device 210, in the database in step 211. The device information may include at least one of an identification code, a model name, a system version, and hardware information. The identification code refers to the IMEI that is a unique number assigned to every electronic device by the manufacturer. The model name refers to the name of the electronic device. The system version refers to the system software version of the electronic device. The hardware information may refer to information about the hardware of the electronic device.

The wireless control device 220 may transmit a management mode booting signal to the electronic device 210 in step 212. The management mode booting signal may include communication connection information and commands for requesting the device information about the electronic device 210. The communication connection information may be a MAC address of an object that is to receive the device information.

When the electronic device 210 receives the management mode booting signal, it may be booted by the management booting system in a management mode in step 213. When the electronic device 210 is initialized and then booted, it may access a memory and may read/write information to/from the memory. The device-related information about the electronic device 210 is stored in a certain area of the memory. The electronic device 210 may extract the device-related information stored in the memory. The electronic device 210 may transmit the extracted device information to the wireless control device 220 in step 214.

When the wireless control device 220 receives the device information from the electronic device 210, it may transmit the device information to the system management server 230 in step 215. The wireless control device 220 and the system management server 230 may be connected to each other in wired mode or through a second wireless network such as Wi-Fi.

According to an embodiment of the present disclosure, after receiving the device information, the wireless control device 220 may transmit an update start signal to the electronic device 210. When the electronic device 210 transmitted the device information to the wireless control device 220 but has not received an update start signal from the wireless control device 220 within a preset period of time since the transmission, the electronic device 210 may be turned off.

The system management server 230 may compare the system version included in the device information with the recent system version stored in the database in step 216. When the system version (e.g. system version number) is less than the recent system version, the system management server 230 may determine that the electronic device 210 needs to be updated. The system management server 230 may transmit a system update file of the recent system version to the wireless control device 220 in step 217. The system update file may be a binary full change file of the recent system version or a delta file created for only a part of the system version to be updated, which is the only part of the system version that can be extracted from the delta file. According to an embodiment of the present disclosure, the system management server 230 provides an authorization and a uniform resource locator (URL) for receiving the system update file, so that the electronic device 210 can download the system update file from a website at the URL.

According to an embodiment of the present disclosure, the system management server 230 is directly connected to the electronic device 210 through a wireless network, and may transmit the system update file directly to the electronic device 210 without using the wireless control device 220. In this case, the electronic device 210 may establish a communication channel for a direct connection with the system management server 230.

The wireless control device 220 may receive the system update file from the system management server 230 and then transmit it to the electronic device 210 in step 218.

The electronic device 210 may update system software using the system update file in step 219. According to an embodiment of the present disclosure, when the electronic device 210 receives a command for supplying power from a user's direct input, it may remove the management booting system. For example, when a user presses, for the first time, a "power on button" to supply power located on the input/output interface 140, the electronic device 210 may remove the management booting system from the memory.

Figure 3A:
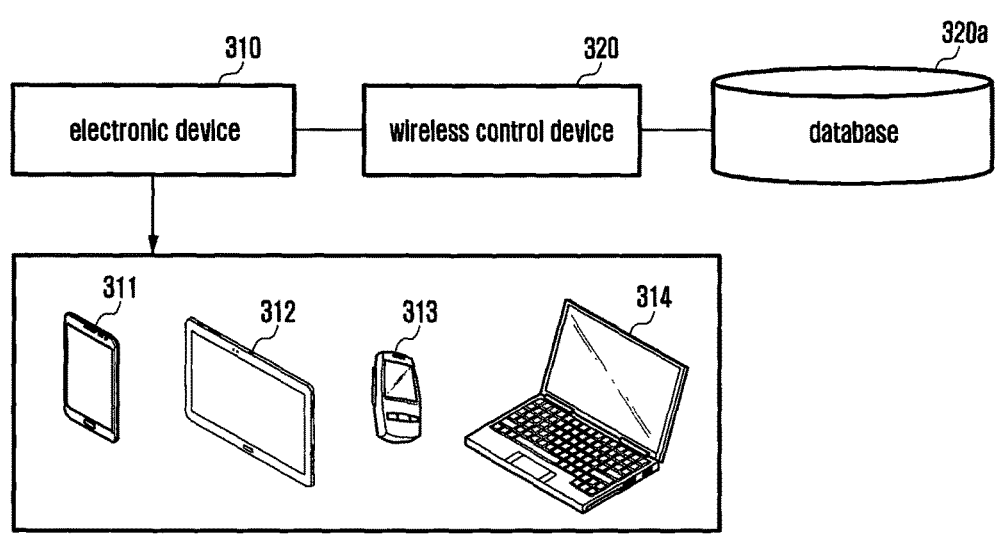
FIG. 3A is a block diagram of a network environment including an electronic device and a wireless control device according to an embodiment of the present disclosure.

FIG. 3A is a block diagram of a network environment including an electronic device and a wireless control device according to an embodiment of the present disclosure.

Referring to FIG. 3A, the electronic device 310 (e.g., electronic device 101 of FIG. 1) may perform wireless charging and also update system software, by establishing a wireless communication with the device 320. The wireless control device 320 may also serve to perform functions of a system management server. That is, the wireless control device 320 may perform an update function as well as a wireless charging function. To this end, the wireless control device 320 may include a database 320a. The database 320a may store system update files of a recent system version. The system update file may be a binary full change file of the recent system version or a delta file created as a part of the system version to be updated, where only the part of the system version to be updated can be extracted from the delta file. Examples of the electronic device 310 include a mobile device 311, a tablet PC 312, an MP3 Player 313, a laptop 314, etc. as shown in FIG. 3A.

Figure 3B:
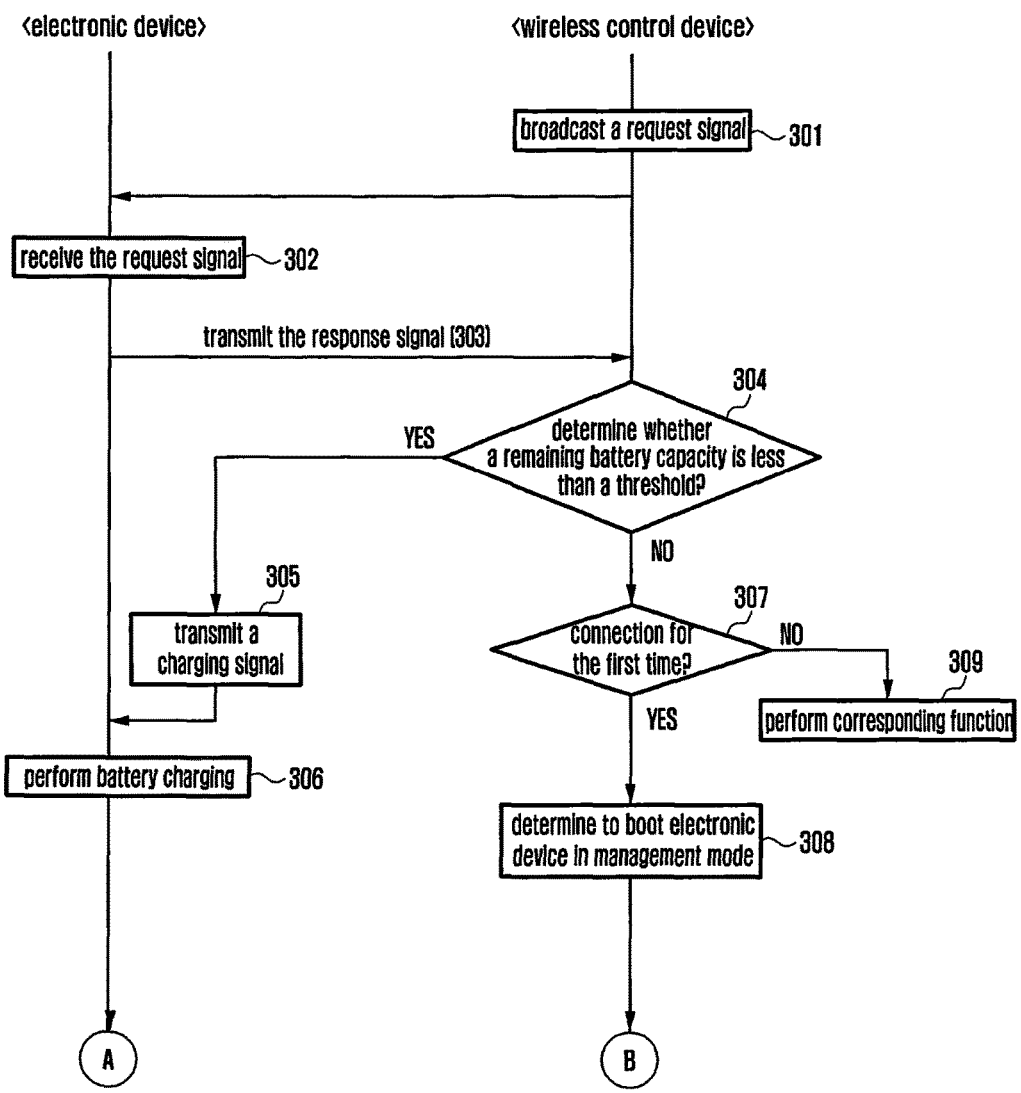
FIG. 3B is a flow diagram of a wireless charging method applied to the network environment of FIG. 3A according to an embodiment of the present disclosure.

FIG. 3B is a flow diagram of a wireless charging method applied to the network environment of FIG. 3A according to an embodiment of the present disclosure. Since the wireless charging method of FIG. 3B is the same as that of FIG. 2B, its detailed description is omitted below.

Referring to FIG. 3B, the wireless control device 320 may broadcast a request signal over a preset area in step 301. The electronic device 310 may receive the request signal from the wireless control device 320 in step 302. During the wireless charging, the electronic device 310 and the wireless control device 320 are connected to each other via a first wireless network.

The electronic device 310 may transmit a response signal to the wireless control device 320, in response to the request signal, in step 303. The response signal may include one or more of a device identifier, a remaining battery capacity, and status information about the electronic device 310. The status information may include version information about software, a condition as to whether a software binary file is abnormal, and a condition as to whether an initialization is performed (e.g. a case where a log is not allowed to remain for a test).

After receiving the response signal, the wireless control device 320 may determine whether the remaining battery capacity is less than a threshold in step 304. When the remaining battery capacity is less than a threshold in step 304, the wireless control device 320 may transmit a signal for charging the battery to the electronic device 310 in step 305. When the electronic device 310 receives the charging signal from the wireless control device 320, it may charge the battery by the charging signal in step 306.

In contrast, when the remaining battery capacity is greater than the threshold in step 304, the wireless control device 220 may determine whether the electronic device 310 has transmitted the response signal to, or made a connection with, the wireless control device 320 for the first time in step 307. When the electronic device 310 has made a connection with the wireless control device 320 for the first time in step 307, the wireless control device 320 may determine to boot the electronic device 310 in a management mode in step 308.

In contrast, when the wireless control device 320 ascertains that the connection with the electronic device 310 is not for the first time in step 307, it may determine whether to update the system of the electronic device 310 by using the device identifier included in the response signal, in step 309. For example, the wireless control device 320 determines whether the system of the device identifier, stored in the database 320a, is the recent version, thereby determining whether the electronic device 310 must be updated.

According to an embodiment of the present disclosure, when the system version corresponding to the device identifier included in the response signal is the same as the recent system version stored in the database 320a, the wireless control device 320 does not update the system of the electronic device 310. However, when the system version corresponding to the device identifier included in the response signal differs from the recent system version of the device identifier stored in the database 320a, the wireless control device 320 determines to update the system of the electronic device 310. In this case, the wireless control device 320 may perform step 308 and may determine to boot the electronic device 310 in a management mode. In addition, if a software binary file is abnormal (e.g. Its system version does not match the present system version) or the initialization is abnormal (e.g. a log has remained for a test if a log is not allowed to remain for a test), where the conditions as to whether a software binary file is abnormal and an initialization is performed are included in the status information of the electronic device 310, the wireless control device 320 may determine to boot the electronic device 310 in a management mode. Booting the electronic device 310 in a management mode updates the system of the electronic device 310. The update method is described as follows with reference to FIG. 3C.

Figure 3C:
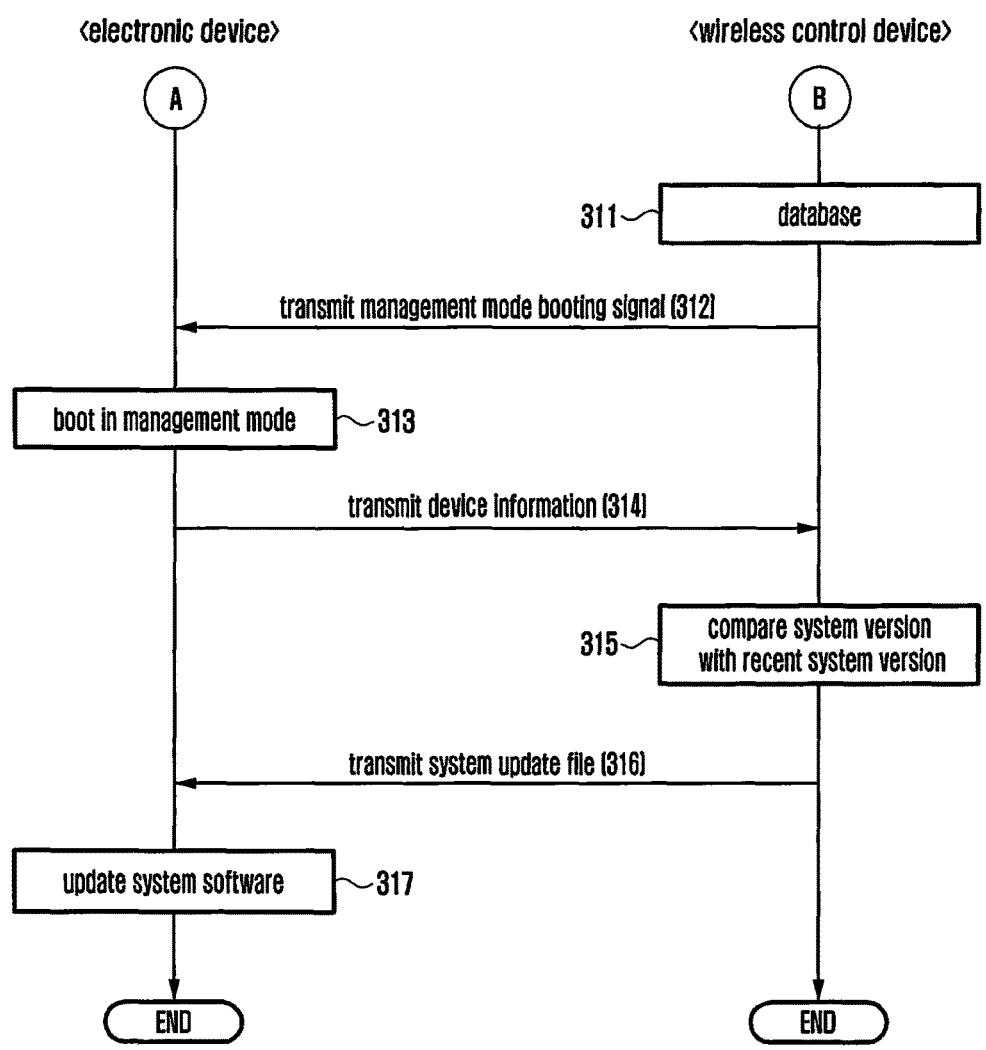
FIG. 3C is a flow diagram of an update method applied to the network environment of FIG. 3A according to an embodiment of the present disclosure.

FIG. 3C is a flow diagram of an update method applied to the network environment of FIG. 3A according to an embodiment of the present disclosure.

Referring to FIG. 3C, the wireless control device 320 may store system update files of the recent system version in the database 320a in step 311. The database 320a may store remaining battery capacities by identifiers of electronic devices that have made a connection, even once. In an embodiment of the present disclosure, the database 320a may further store system update files by system versions or device information about an electronic device that has made a connection, even once. The device information may include at least one an identification code, a model name, a system version, and hardware information.

The wireless control device 320 may transmit a management mode booting signal to the electronic device 310 in step 312. The management mode booting signal may include communication connection information and commands for requesting the device information about the electronic device 310. The communication connection information may be a MAC address of an object to receive the device information. During the update, the electronic device 310 and the wireless control device 320 may be connected to each other through a second wireless network.

When the electronic device 310 receives the management mode booting signal, it may be booted by the management booting system in a management mode in step 313. The electronic device 310 may extract the device information stored in the memory. The electronic device 310 may transmit the extracted device information to the wireless control device 320 in step 314.

When receiving the device information, the wireless control device 320 may compare the system version included in the device information with the recent system version stored in the database 320a in step 315. According to an embodiment of the present disclosure, after receiving the device information, the wireless control device 320 may transmit a management mode booting start signal to the electronic device 310. When the electronic device 310 transmitted the device information to the wireless control device 320 but has not received a management mode booting start signal from the wireless control device 320 within a preset period of time since the transmission, the electronic device 310 may be turned off.

When the system version (e.g. system version number) is less than the stored, recent system version, the wireless control device 320 may transmit a system update file of the recent system version to the electronic device 310 in step 316. The wireless control device 320 may transmit the system update file to the electronic device 310 through a first wireless network, such as Zigbee, Bluetooth, etc. In addition, the wireless control device 320 may transmit the system update file to the electronic device 310 through a second wireless network, such as Wi-Fi. For example, the wireless control device 320 and the electronic device 310 are connected to each other through the first wireless network in step 312, and through the second wireless network in step 316.

In addition, the wireless control device 320 may provide the electronic device 310 with authorization and a URL to receive the system update file, so that the electronic device 310 can download the system update file from a website at the URL.

The electronic device 310 may update the system software by using the system update file in step 317. According to according to an embodiment of the present disclosure, when the "power on button" to supply power, located on the input/output interface 140, is selected for the first time, the electronic device 310 ascertains that the user has directly input a command for supplying power. In this case, the electronic device 310 may remove the management booting system from the memory.

Figure 4A:
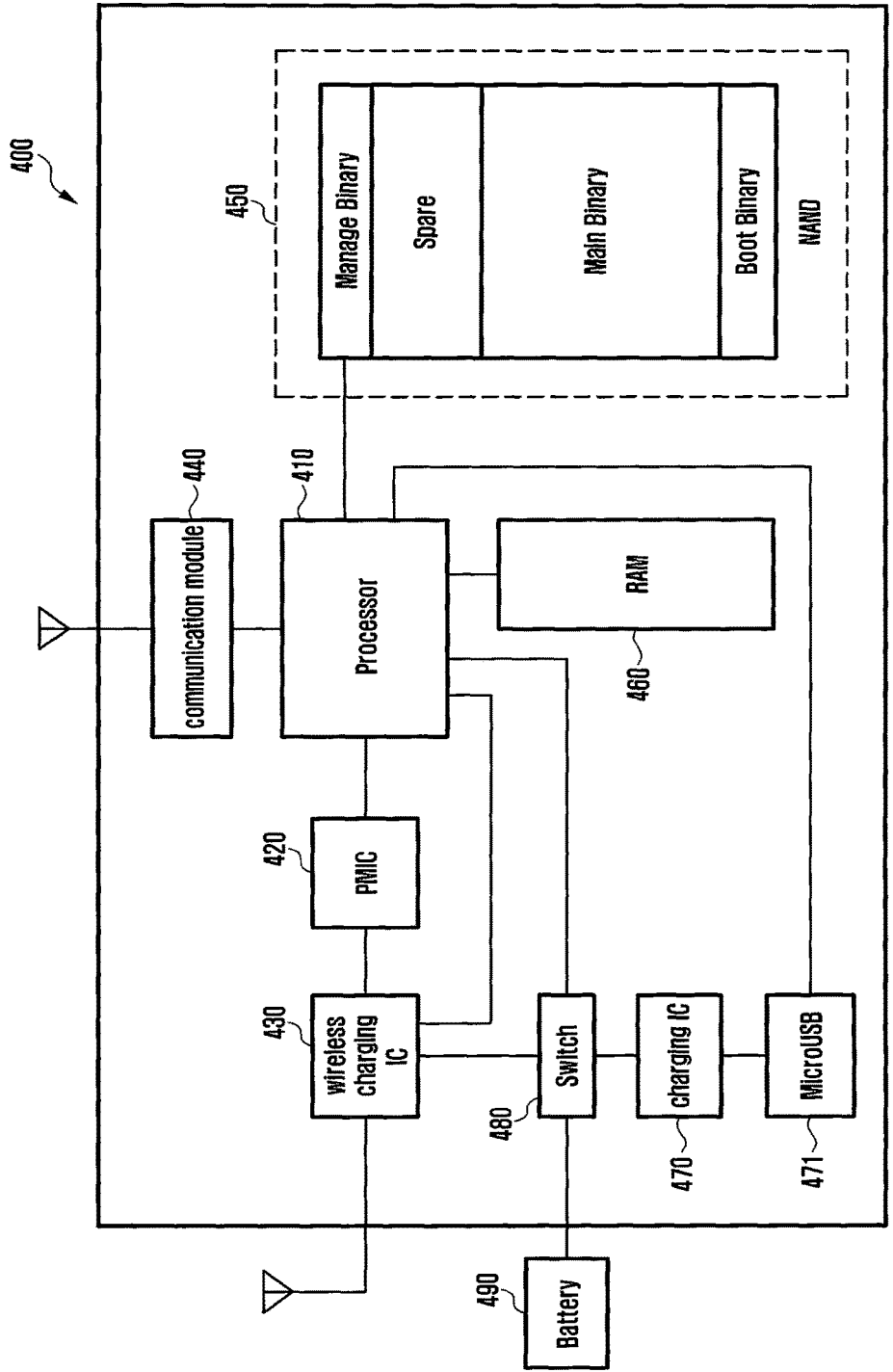
FIG. 4A is a block diagram of an electronic device according to an embodiment of the present disclosure.

FIG. 4A is a block diagram of an electronic device 400 according to an embodiment of the present disclosure.

Referring to FIG. 4A, the electronic device 400 may include a processor 410, a power management integrated circuit (PMIC) 420, a wireless charging IC 430, a communication module 440, NAND flash memory (or NAND) 450, random access memory (RAM) 460, a charging IC 470, a micro USB 471, a switch 480, and a battery 490.

Figure 4B:
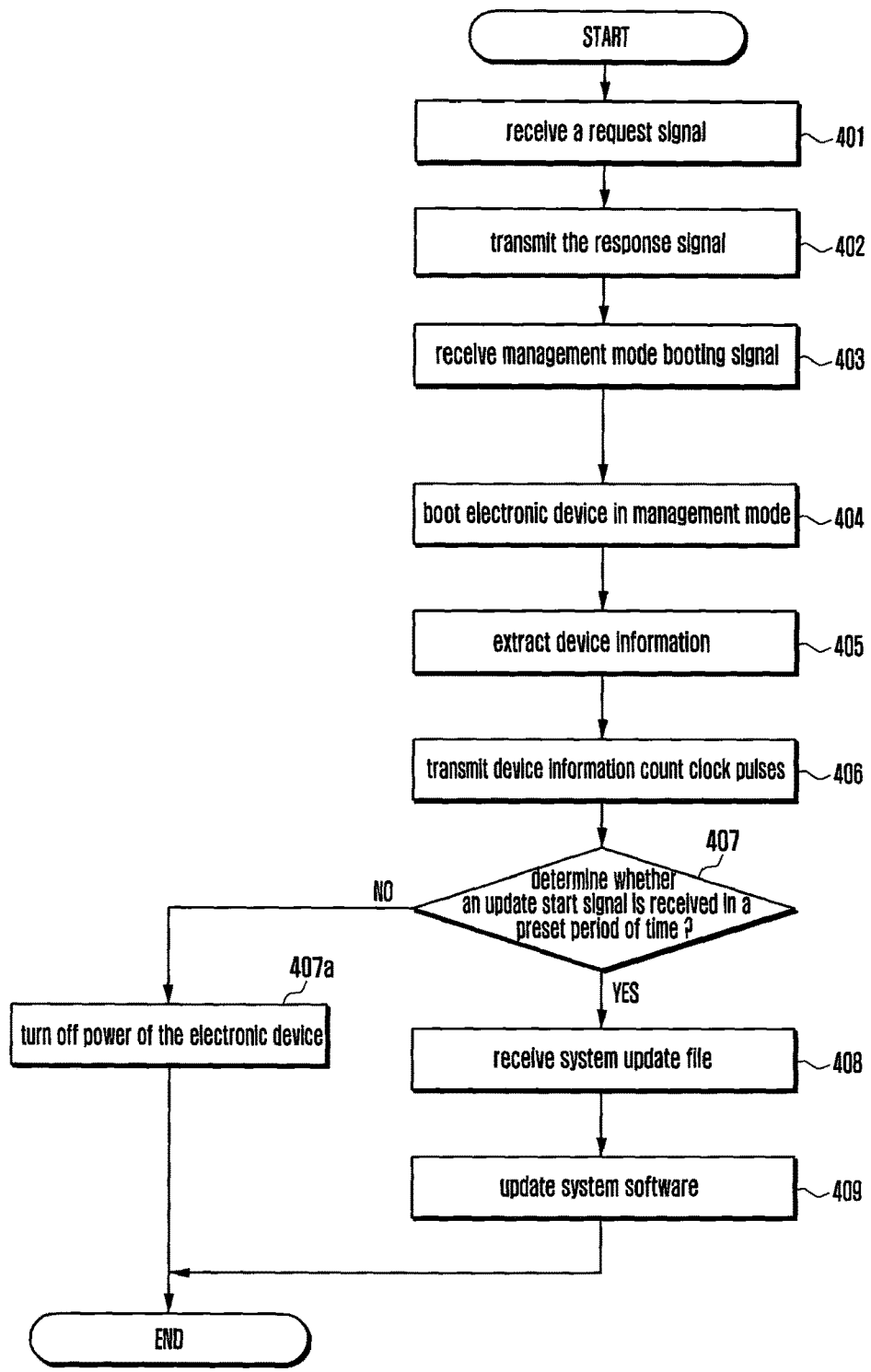
FIGS. 4B and 4C are flowcharts of wireless control methods of an electronic device according to embodiments of the present disclosure.

FIG. 4B is a flow diagram of an update method of the electronic device 400 of FIG. 4A according to an embodiment of the present disclosure.

Referring to FIGS. 4A and 4B, the wireless charging IC 430 may receive a request signal from a wireless control device in step 401. The wireless charging IC 430 may communicate with the wireless control device through a first wireless network. To this end, the wireless charging IC 430 may further include a communication module. The wireless charging IC 430 may detect the request signal in real-time.

The wireless charging IC 430 may transmit the response signal to the wireless control device in response to the request signal in step 402. The response signal may include one or more of a device identifier for identifying the electronic device 400, a remaining battery capacity of the battery 490 of the electronic device 400, and the status information about the electronic device 400. The device identifier may be implemented with an IMEI included in the device information or any other type of identifier. The wireless charging IC 430 may further include a control module. The control module of the wireless charging IC 430 serves as a device having the same or similar functionality as the processor 410, and may detect the battery 490 in a state where the electronic device 400 is not turned on.

When the remaining battery capacity is less than a threshold or the response signal is transmitted for the first time, the wireless charging IC 430 may receive a management mode booting signal from the wireless control device in step 403. The management mode booting signal may include communication connection information and commands for requesting the device information about the electronic device 400. The communication connection information may be a MAC address of an object to receive the device information. The wireless charging IC 430 controls the PMIC 420 to supply electrical power to the processor 410, thereby waking up the processor 410. For example, the control module of the wireless charging IC 430 may control the PMIC 420 to supply electrical power to the processor 410.

The processor 410 may boot the electronic device 400 in a management mode by using a management booting system in step 404. When electrical power is supplied to the processor 410, the processor 410 initializes the electronic device 400. When the booting process is completed, the processor 410 may access the memory, i.e., RAM 460 and NAND 450, and read/write information out/to the memory. The NAND 450 stores the device information about the electronic device 400.

The processor 410 may extract the device information stored in the NAND 450 in step 405. The device information includes at least one of an identification code, a model name, a system version, and hardware information, which are related to the electronic device 400. The identification code refers to an IMEI, i.e., a unique identification number that is assigned to an electronic device by the manufacturer. The model name refers to the name of the electronic device. The system version refers to the system software version of the electronic device. The hardware information may refer to information about the hardware of the electronic device.

The processor 410 may transmit the device information to the wireless control device and may count clock pulses in step 406.

After transmitting the device information, the processor 410 may determine whether to receive a management mode booting start signal from the wireless control device within a preset period of time in step 407.

When the processor 410 ascertains that a management mode booting start signal is not received in step 407, it may turn off power of the electronic device 400 in step 407a. On the contrary, when the processor 410 ascertains that a management mode booting start signal is received in step 407, it may wait for the reception of a system update file.

The processor 410 may receive a system update file from the wireless control device through the communication module 440 in step 408. The processor 410 may update the system software by using the system update file in step 409. The system update file may be a binary full change file of the recent system version or a delta file created for a part of the system version to be updated, which is the only part of the system version that can be extracted from the delta file. In addition, the processor 410 may receive authorization and a URL to receive the system update file from the wireless control device through the communication module 440, and may download the system update file from a website at the URL. When the processor 410 receives the system update file, URL, or authorization, it may perform control operations so that the electronic device 400 can communicate with the wireless control device through the second wireless network.

Although FIG. 4B is described so that the processor 410 receives the system update file, URL and authorization from the wireless control device, it should be understood that the processor 410 may also receive the system update file, URL and authorization directly from the system management server through the communication module 440.

Figure 4C:
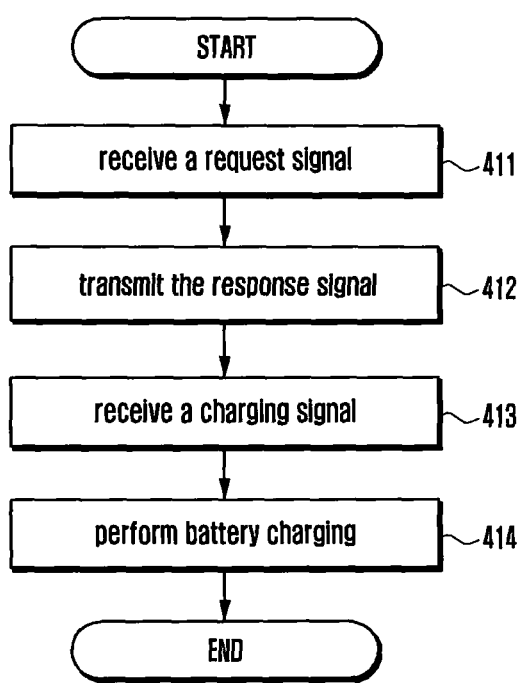

FIG. 4C is a flowchart of a wireless charging method of the electronic device 400 of FIG. 4A according to an embodiment of the present disclosure.

Referring to FIGS. 4A and 4C, the wireless charging IC 430 may receive a request signal from the wireless control device in step 411.

The wireless charging IC 430 may transmit a response signal to the wireless control device in response to the request signal in step 412.

When the remaining battery capacity is less than a threshold, the wireless charging IC 430 may receive a charging signal from the wireless control device in step 413.

The wireless charging IC 430 may charge the battery 490 by the charging signal in step 414. In this case, the switch 480 performs a switching operation to transmit the charging signal form the wireless charging IC 430 to the battery 490. In general, the switch 480 performs a switching operation to connect to the charging IC 470. However, the switch 480 may perform a switching operation to connect to the wireless charging IC 430 for only a wireless charging process. The control module of the wireless charging IC 430 may charge the battery 490 without turning on the power of the electronic device 400.

Since the other components included in the electronic device 400 were described above with reference to FIG. 1 and are described below with reference to FIG. 9, their detailed description is omitted below with reference to FIGS. 4A to 4C.

Figure 5A:
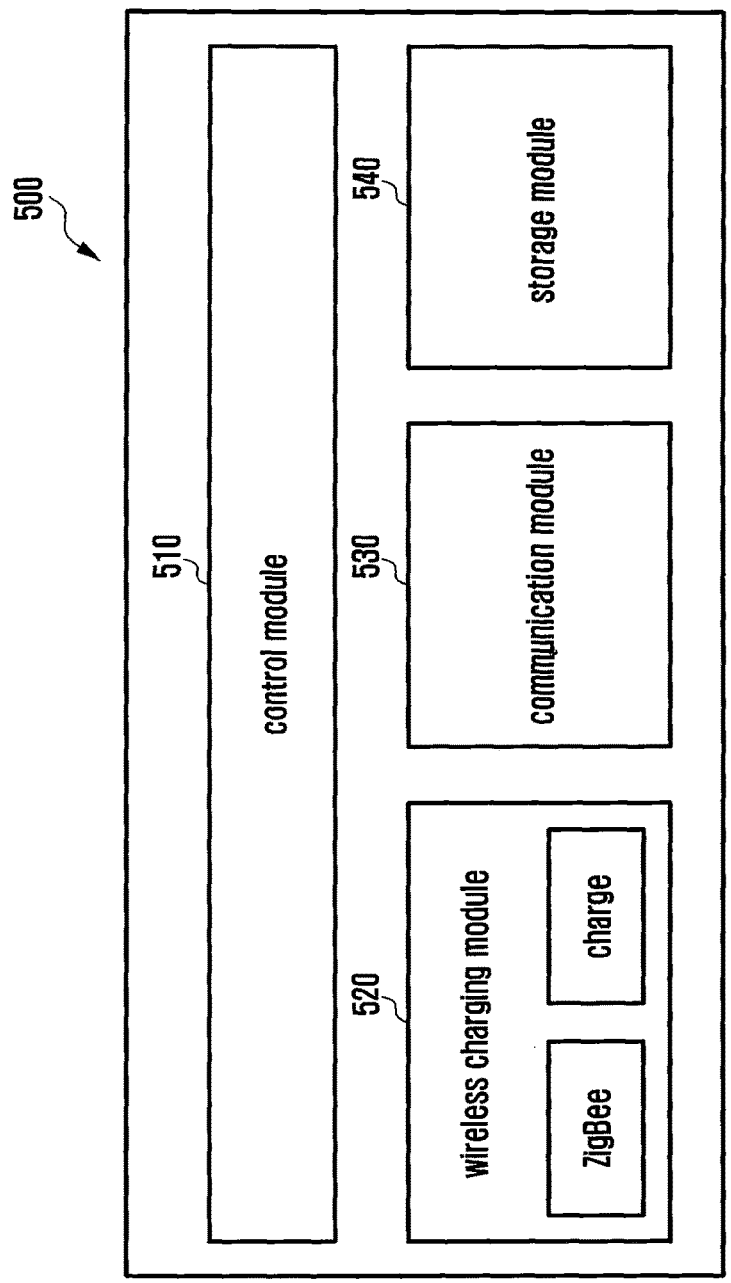
FIG. 5A is a block diagram of a wireless control device according to an embodiment of the present disclosure.

FIG. 5A is a block diagram of a wireless control device according to according to an embodiment of the present disclosure.

Referring to FIG. 5A, the wireless control device 500 may include a control module 510, a wireless charging module 520, a communication module 530 and a storage module 540. The control module 510 serves as a processor and controls the wireless charging module 520, the communication module 530 and the storage module 540. The control module 510 may determine whether to update the system of the electronic device or whether to charge the battery of the electronic device. The wireless charging module 520 may control the wireless charging operation of the electronic device through a first wireless network such as Zigbee. The communication module 530 may communicate with the electronic device through a second wireless network such as Wi-Fi and may transmit update-related information about the electronic device to the electronic device. The storage module 540 may store remaining battery capacities by identifiers of electronic devices that have made a connection, even once. The storage module 540 may store a system update file of the recent system version or system update files by system versions. The storage module 540 may also store device information about an electronic device that has made a connection, even once.

Figure 5B:
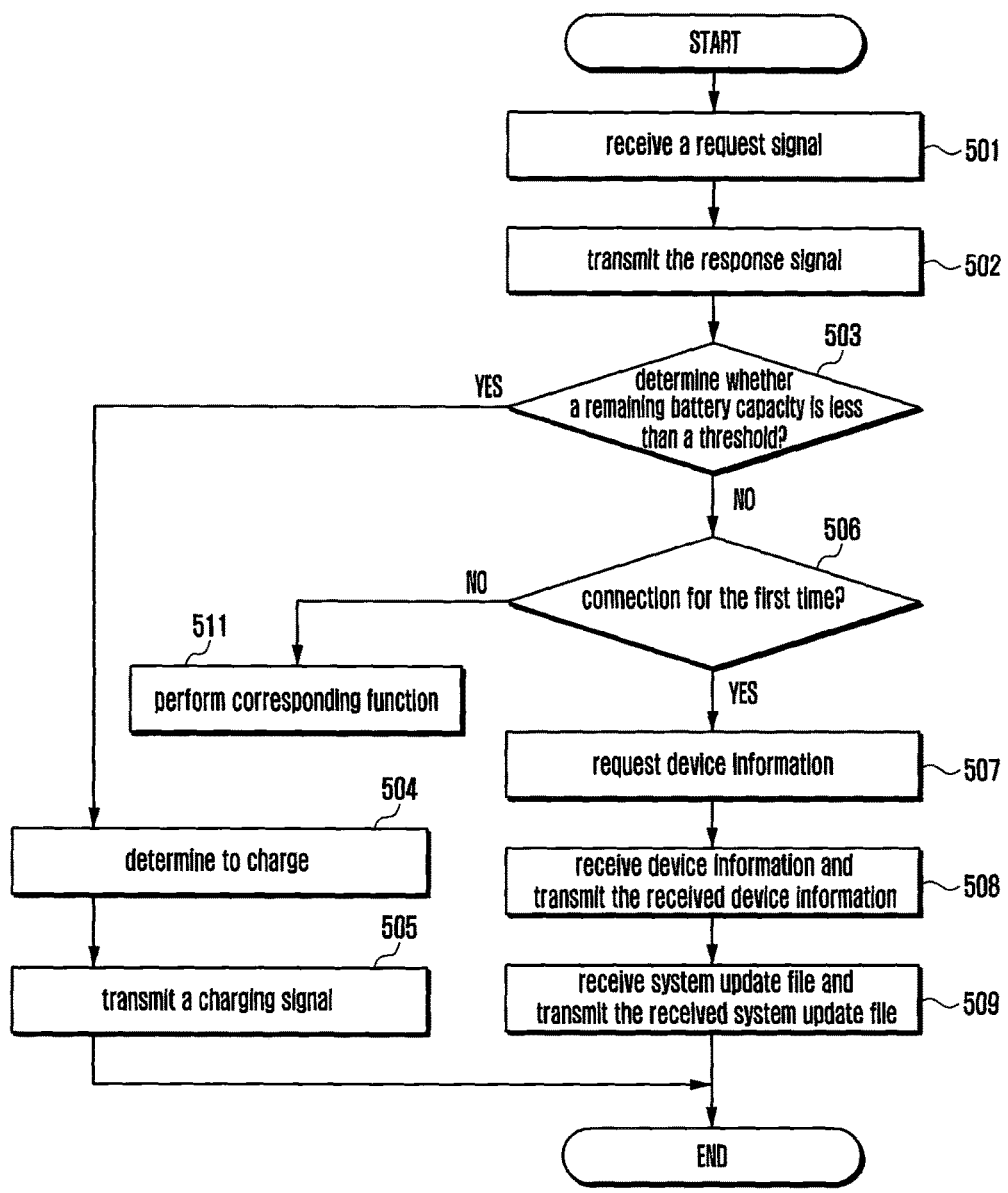
FIG. 5B is a flowchart of a wireless control method of a wireless control device according to an embodiment of the present disclosure.

FIG. 5B is a flowchart of a wireless control method of a wireless control device of FIG. 5A.

Referring to FIG. 5B, the wireless charging module 520 may broadcast a request signal over a preset area in step 501. The preset area may be a charging area or a communication area. The charging area may refer to a region in which a charging signal is receivable for charging. The communication area may refer to a region in which the request signal is receivable. The request signal may include an identifier for identifying the wireless control device 500. The wireless charging module 520 may broadcast the request signal through the first wireless network.

The wireless charging module 520 may receive a response signal from the electronic device in response to the request signal in step 502. The response signal may include at least one of a device identifier for identifying the electronic device, a remaining battery capacity of the electronic device and status information about the electronic device.

The control module 510 may determine whether the remaining battery capacity is less than a threshold in step 503. When the control module 510 ascertains that the remaining battery capacity is less than a threshold in step 503, it may perform step 504. When the control module 510 ascertains that the remaining battery capacity is greater than or equal to the threshold in step 503, it may perform step 506.

When the control module 510 ascertains that the remaining battery capacity is less than a threshold in step 503, it may determine to charge the battery of the electronic device in step 504. The wireless charging module 520 may transmit a charging signal for battery charging to the electronic device in step 505. The charging signal may include instructions for informing the electronic device when and how the battery charge is performing.

In contrast, when the control module 510 ascertains that the remaining battery capacity is greater than or equal to the threshold in step 503, it may determine whether the electronic device has transmitted the response signal to or made a connection with the wireless control device 500, for the first time, in step 506. When the control module 510 ascertains that the electronic device has not made a connection for the first time in step 506, it may perform step 511. When the control module 510 ascertains that the electronic device has made a connection for the first time in step 506, it may perform step 507. In order to determine whether the electronic device has made a connection for the first time, the control module 510 may determine whether the identifier included in the response signal matches that of an electronic device stored in the storage module 540. For example, if an electronic device has made a connection with the wireless control device 500, even once, the device information is stored in the storage module 540. Therefore, when the control module 510 ascertains that an identifier of an electronic device has not been stored in the storage module 540, it may determine that the connection by the electronic device is for the first time.

When the control module 510 ascertains that the electronic device has made a connection for the first time in step 506, it may determine to boot the electronic device in a management mode, so that the communication module 530 can transmit a management mode booting signal to the electronic device in step 507. The management mode booting signal may include communication connection information and commands for requesting the device information about the electronic device. The communication connection information may be a MAC address of an object to receive the device information. In an embodiment of the present disclosure, the communication connection information may include a password or an authentication key for connection. The communication module 530 may transmit the management mode booting signal through a second wireless network. In an embodiment of the present disclosure, the communication module 530 may be connected to the electronic device through a second wireless network, only when the communication module 530 authenticates the electronic device, by receiving the correct password or the transmitted authentication key. After transmitting the management mode booting signal, the communication module 530 may also transmit, to the electronic device, a management mode booting start signal instructing that the electronic device wait to be booted in a management mode.

The communication module 530 may receive the device information from the electronic device and transmit it to the system management server in step 508.

In an embodiment of the present disclosure, the communication module 530 may not transmit the device information to the system management server. In this case, the storage module 540 may store a system update file of the recent system version or system update files by system versions. The device information may include at least one of an identification code, a model name, a system version, and hardware information.

The communication module 530 may receive a system update file of the recent system version from the system management server and transmit it to the electronic device in step 509. The communication module 530 may transmit the system update file of the recent system version stored in the storage module 540 to the electronic device. The communication module 530 may also transmit an authorization and a ULR to receive the system update file to the electronic device. In this case, the electronic device may download the system update file from a website at the URL.

In contrast, when the control module 510 ascertains that the electronic device has not made a connection for the first time in step 506, it may determine whether to update the system of the electronic device in step 511. For example, the control module 510 may determine the system version of the device identifier stored in the storage module 540 is the recent version. When the control module 510 ascertains that the system version of the device identifier stored in the storage module 540 is not the recent version, it may determine to boot the electronic device in a management mode, so that the communication module 530 transmits the management mode booting signal to the electronic device. In contrast, when the control module 510 ascertains that the system version of the device identifier stored in the storage module 540 is the recent version, it may terminate the procedure. In addition, when the control module 510 ascertains that the system version of the device identifier stored in the storage module 540 is the recent version, it may transmit a charging signal to the electronic device so that the battery of the electronic device can be fully charged.

Figure 6A:
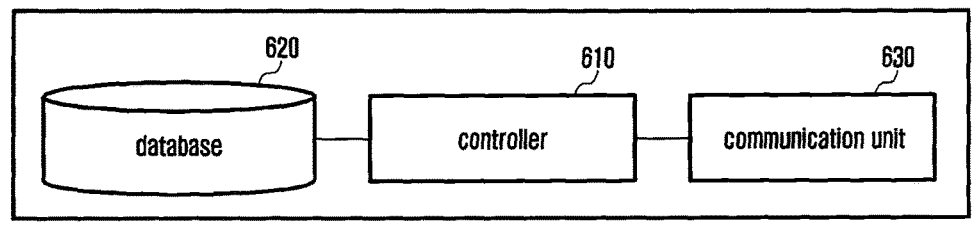
FIG. 6A is a block diagram of a system management server according to an embodiment of the present disclosure.

FIG. 6A is a block diagram of a system management server according to an embodiment of the present disclosure.

Referring to FIG. 6A, the system management server may include a controller 610, a database 620 and a communication unit 630. The system management server may be a server for managing sales or inventory of electronic devices of the electronic device manufacturers or mobile communication service providers. The controller 610 serves as a processor and controls the database 620 and communication unit 630. The system management server may store, in the database 620, at least one of a model name corresponding to an identification code of an electronic device at a point in time when the electronic device was manufactured, a point in time when a seller sold the electronic device, and a point in time when the response signal was transmitted to the wireless control device, the system version, the hardware information, and the remaining battery capacity. The database 620 may store a system update file of the recent system version. The system update file may be a binary full change file of the recent system version or a file created as part of the system to be updated, where only the part of the system to be updated is extracted from the file. The communication unit 630 may communicate with the wireless control device or the electronic device through a network and transmit/receive data thereto/therefrom.

Figure 6B:
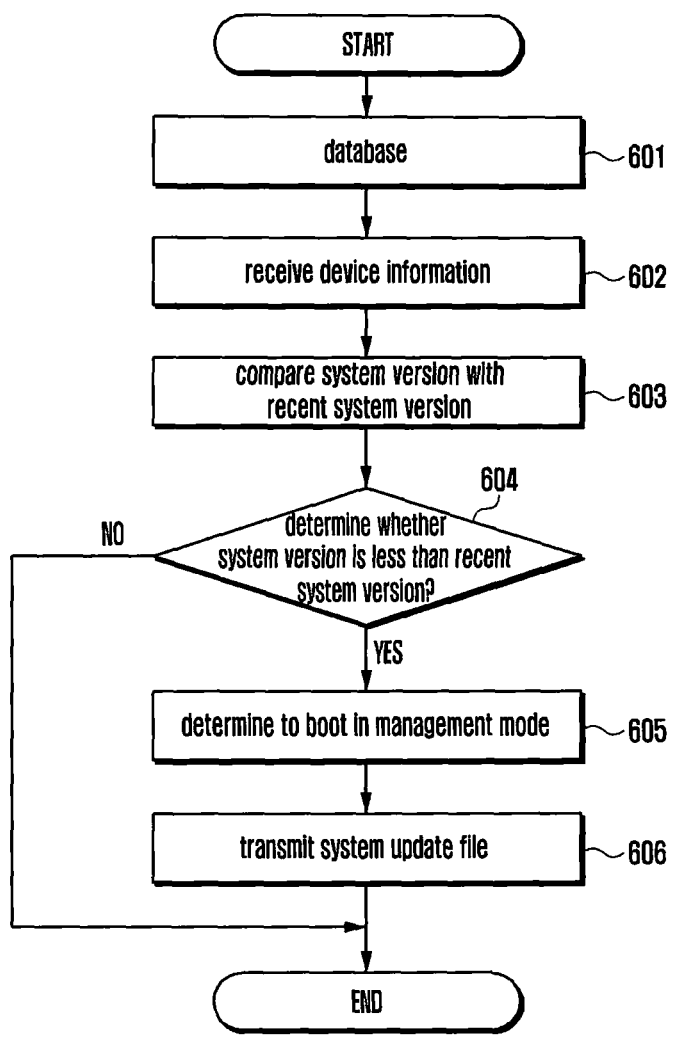
FIG. 6B is a flowchart of an update method of a system management server according to an embodiment of the present disclosure.

FIG. 6B is a flowchart of an update method of a system management server of FIG. 6A.

Referring to FIG. 6B, the database 620 may store device information related to the electronic device and system update files by versions in step 601.

The communication unit 630 may receive device information from the electronic device or the wireless control device in step 602. The device information may include at least one of a model name corresponding to an identification code, a system version, hardware information, and remaining battery capacity. When the electronic device transmits the device information to the wireless control device, the wireless control device may transmit the device information to the system management server. When the electronic device may perform network communication, it may transmit the device information directly to the system management server. In this case, the electronic device may establish a communication channel to connect directly to the system management server.

The controller 610 may compare the system version included in the received device information to the recent system version (e.g. version number) stored in the database 620 in step 603. The higher the version (e.g. version number) the newer the system.

The controller 610 may determine whether the system version is less than the recent system version in step 604.

When the controller 610 ascertains that the system version is less than the recent system version in step 604, it may determine to update the system in step 605. In contrast, when the controller 610 ascertains that the system version is greater than or equal to the recent system version in step 604, it may terminate the procedure.

The controller 610 may transmit a system update file of the recent system version to the electronic device or the wireless control device in step 606. The system update file may be a binary full change file of the recent system version or a file created for part of the system to be updated, where only the part of the system to be updated is extracted from the file. The controller 610 may transmit an authorization and a ULR to receive the system update file to the electronic device or the wireless control device. In this case, the electronic device may download the system update file from a website at the URL.

FIG. 6C is a database of a system management server of FIG. 6A according to an embodiment of the present disclosure.

Referring to FIG. 6C, the database 620 includes a number of fields according to IDs 621, e.g., IMEI 622, model 623, AP binary versions 624, CP binary version 625, update check 626, binary ready 627, and charging 628, which are related to the electronic device. IMEI 622 refers to an international mobile equipment identity (IMEI) that is a unique number assigned to every electronic device by the manufacturer. Model 623 refers to the name of the electronic device. AP binary version 624 and CP binary version 625 refer to system versions of an electronic device that require software updates. Update check 626 refers to whether an update has been performed. Binary ready 627 refers to whether an electronic device is ready to receive a system update file.

For example, when an electronic device has an identification code (IMEI) 622 while it is manufactured as a product, the controller 610 may first store the IMEI 622, the model name 623, and the charging 628 indicating the remaining battery capacity in the database 620. Then, according to whether the electronic device is connected to the wireless control device, the controller 610 may update information about the AP binary version 624, the CP binary version 625, the update check 626, the binary ready 627, and the charging 628. For example, referring to FIG. 6C, for an electronic device ID 10 that has IMEI "74563245698741" and model "GG8563" and an electronic device ID 11 that has IMEI "976413515395574" and model "A737ZG," since they have not made a connection with the wireless control device, even once, the controller 610 may not update information about the AP binary version 624, the CP binary version 625, the update check 626, the binary ready 627, and the charging 628.

In contrast, referring to FIG. 6C, for electronic devices ID 1 with IMEI "124523584539221," ID 2 with IMEI "325125456852456," ID 3 with IMEI "245698532147555," ID 4 with IMEI "125478965523214," ID 5 with IMEI "458965852123456," etc., since they have made a connection with the wireless control device, even if only once, the controller 610 may update information about the AP binary version 624, the CP binary version 625, the update check 626, the binary ready 627, and the charging 628.

FIGS. 7A and 7B are diagrams of a network for performing a wireless charging process according to an embodiment of the present disclosure.

Referring to FIG. 7A, the magnetic power distributor (MPD) 710 may broadcast requests to magnetic power observers (MPOs) 721, 722, 723, and 724 in a preset extent of area. The preset area may be a charging area 730 or a communication area 740. The charging area 730 may refer to a region in which a charging signal is receivable for charging. The communication area 740 may refer to a region in which the request signal is receivable. For example, the radius of the charging area 730 may be less than that of the communication area 740.

Referring to FIG. 7B, the MPD 710 may transmit a charging signal 722a to the MPO 722 that transmitted a response in response to a request to MPD 710. The MPD 710 may transmit a charging signal 724a to the MPO 724 that transmitted a response in response to a request to MPD 710. The MPOs 722 and 724 may charge the batteries by using the charging signals 722a and 724a, respectively.

Figure 7C:
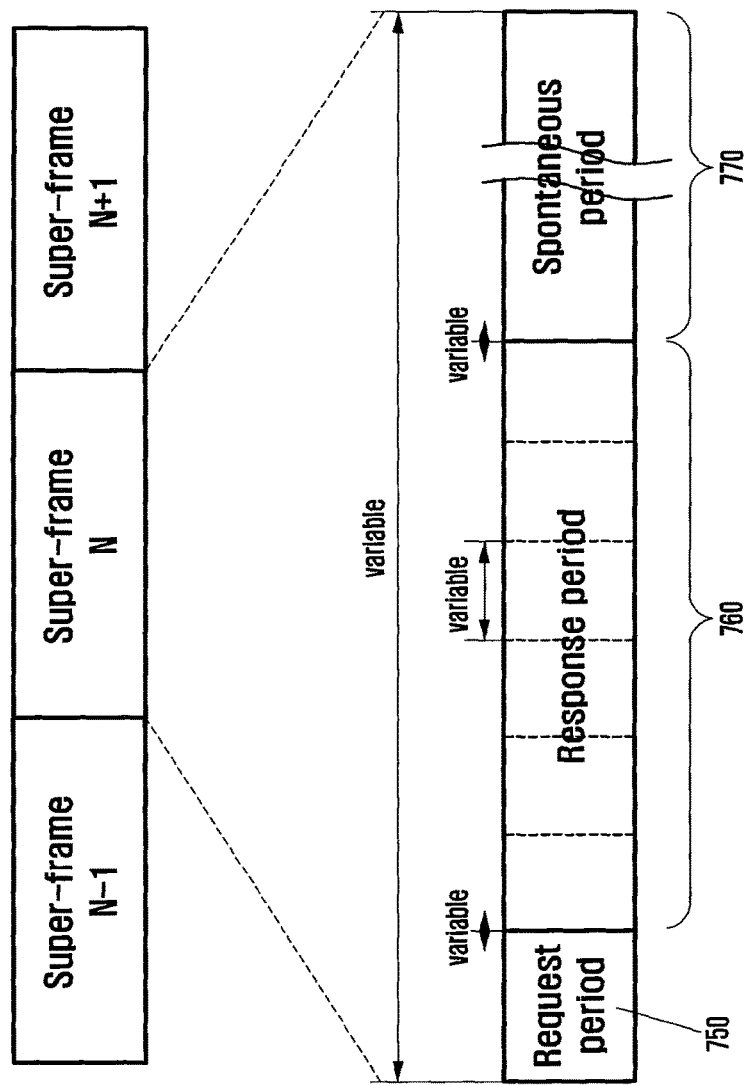
FIG. 7C is a diagram of a super-frame according to an embodiment of the present disclosure.

FIG. 7C is a diagram of a super-frame according to an embodiment of the present disclosure.

Referring to FIG. 7C, the MPD 710 and MPOs 721, 722, 723, and 724 may perform transmission/reception of a request and response in a structure of a super-frame. For example, request period 750 of the super-frame structure is an area for transmission of a request by the MPD 710. Response period 760 of the super-frame structure is an area for transmission of responses by the MPOs 721 to 724. Spontaneous period 770 is an area for transmission of data by the MPOs 721 to 724 without a request by the MPD 710. For example, when the MPD 710 transmits request data through request period 750 to the respective MPOs 712 to 724, the respective MPOs 721 to 724 receive and analyze the request data and perform the corresponding requested functions. When the respective MPOs 721 to 724 transmit slot response data through response period 760, the MPD receives the response data and transmits an acknowledgement (ACK) through request period 750. The respective MPOs 721 to 724 may repeat a transmission of the slot response data, periodically or at a certain period of time, until it has received the ACK from the MPD 710.

FIGS. 8A to 8D are diagrams of data transfer frames of an electronic device according to according to an embodiment of the present disclosure.

Figure 8A:
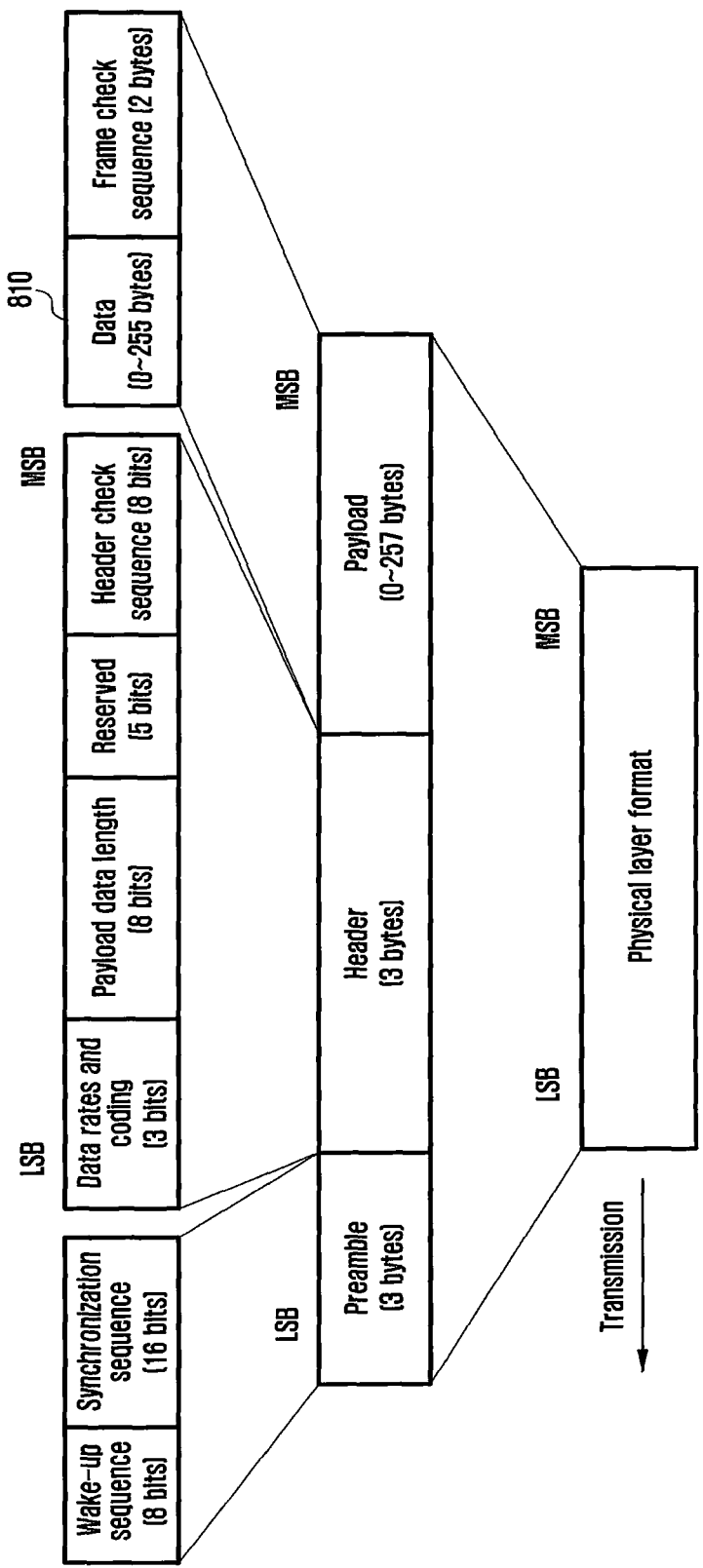
Figure 8B:
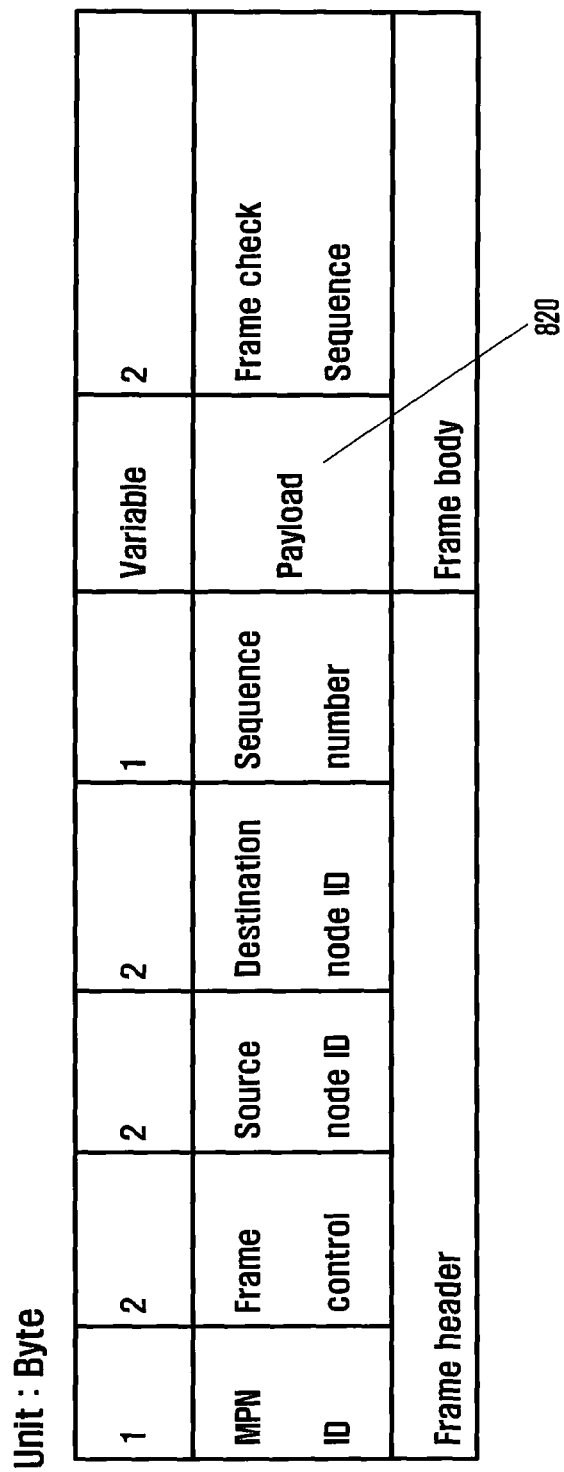
Figure 8C:
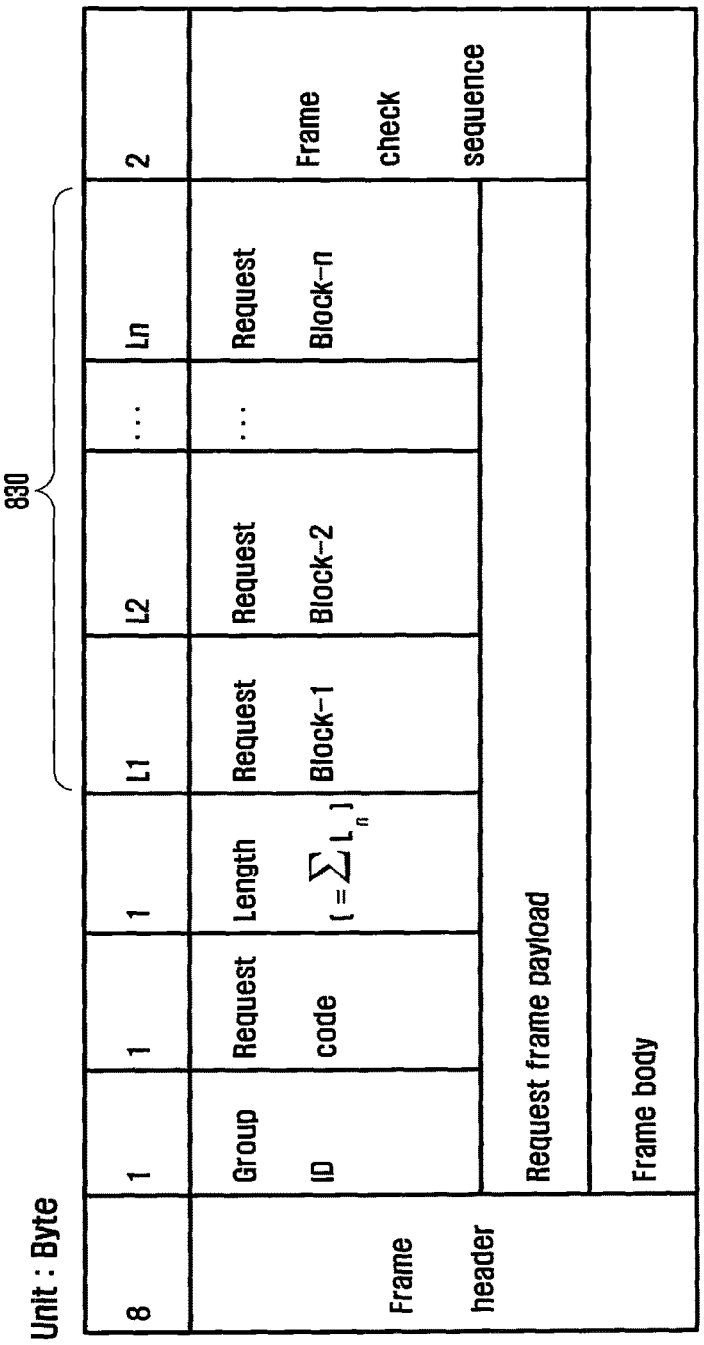

Referring to FIGS. 8A to 8D, FIG. 8A is a frame structure for data transmission from an electronic device. The frame structure is formed in physical layer format and may contain a MAC layer frame format in data 810. FIG. 8B illustrates the MAC layer frame format. Payload 820 may contain response data. FIG. 8C illustrates a request block of the payload 820 of FIG. 8B. Request block 830 is an area for controlling a booting process and a downloading process by using the existing data request/response structure. FIG. 8D illustrates a request block in detail. Slot number 840 may contain a node number of an electronic device. Data 850 may contain information. The wireless charging IC of the electronic device processes information contained in data 850 and transmits the processed information to the PMIC or processor, so that the electronic device can run in a booting mode that differs from a general booting mode.

Figure 9:
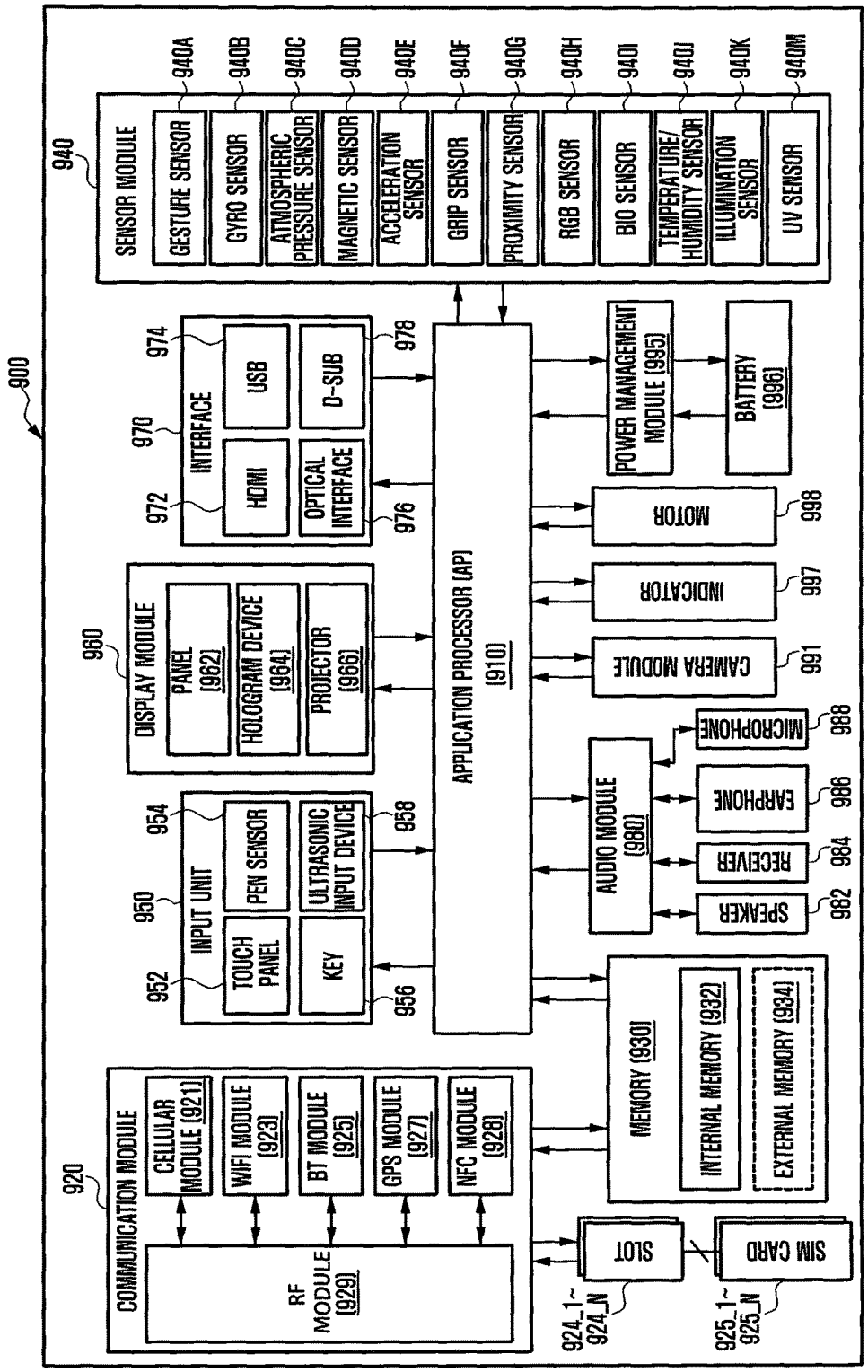
FIG. 9 is a block diagram of an electronic device according to an embodiment of the present disclosure.

FIG. 9 is a block diagram of an electronic device 901 in accordance with an embodiment of the present disclosure.

The electronic device 901 may form, for example, a whole or a part of the electronic device 101 of FIG. 1.

Referring to FIG. 9, the electronic device 901 may include at least one application processor (AP) 910, a communication module 920, a subscriber identification module (SIM) card 924, a memory 930, a sensor module 940, an input unit 950, a display 960, an interface 970, an audio module 980, a camera module 991, a power management module 995, a battery 996, an indicator 997, and a motor 998.

The AP 910 may drive an operating system or applications, control a plurality of hardware or software components connected thereto, and also perform processing and an operation for various data including multimedia data. The AP 910 may be formed of a system-on-chip (SoC), for example. According to an embodiment of the present disclosure, the AP 910 may further include a graphics processing unit (GPU).

The communication module 920 (e.g., the communication interface 160) may perform a data communication with the electronic device 104 or the server 106 connected to the electronic device 901 (e.g., the electronic device 101) through the network. According to an embodiment of the present disclosure, the communication module 920 may include therein a cellular module 921, a Wi-Fi module 923, a BT module 925, a GPS module 927, an NFC module 928, and a Radio Frequency (RF) module 929.

The cellular module 921 may provide a voice call, a video call, a message service, an Internet service, or the like through a communication network (e.g., LTE, LTE-A, CDMA, WCDMA, UMTS, WiBro, or GSM, etc.). Additionally, the cellular module 921 may perform identification and authentication of the electronic device in the communication network, using the SIM card 924. According to an embodiment of the present disclosure, the cellular module 921 may perform at least a part of the functions that the AP 910 can provide. For example, the cellular module 921 may perform at least a part of a multimedia control function.

According to an embodiment of the present disclosure, the cellular module 921 may include a communication processor (CP). Additionally, the cellular module 921 may be formed of an SoC, for example. Although some elements such as the cellular module 921 (e.g., the CP), the memory 930, or the power management module 995 are shown as separate elements being different from the AP 910 in FIG. 9, the AP 910 may be formed to have at least part (e.g., the cellular module 921) of the above elements in an embodiment of the present disclosure.

According to an embodiment of the present disclosure, the AP 910 or the cellular module 921 (e.g., the CP) may load commands or data, received from a nonvolatile memory connected thereto or from at least one of the other elements, into a volatile memory to process them. Additionally, the AP 910 or the cellular module 921 may store data, received from or created by one or more of the other elements, in the nonvolatile memory.

Each of the Wi-Fi module 923, the BT module 925, the GPS module 927 and the NFC module 928 may include a processor for processing data transmitted or received therethrough. Although FIG. 9 shows the cellular module 921, the Wi-Fi module 923, the BT module 925, the GPS module 927 and the NFC module 928 as different blocks, at least part of them may be contained in a single integrated circuit (IC) or chip or a single IC package in an embodiment of the present disclosure. For example, at least part (e.g., the CP corresponding to the cellular module 921 and a Wi-Fi processor corresponding to the Wi-Fi module 923) of respective processors corresponding to the cellular module 921, the Wi-Fi module 923, the BT module 925, the GPS module 927 and the NFC module 928 may be formed as a single SoC.

The RF module 929 may transmit and receive data, e.g., RF signals or any other electrical signals. The RF module 929 may include a transceiver, a power amplifier module (PAM), a frequency filter, a low noise amplifier (LNA), or the like. Also, the RF module 929 may include any component, e.g., a wire or a conductor, for transmission of electromagnetic waves in free air. Although FIG. 9 shows that the cellular module 921, the Wi-Fi module 923, the BT module 925, the GPS module 927 and the NFC module 928 share the RF module 929, at least one of them may perform transmission and reception of RF signals through a separate RF module in an embodiment of the present disclosure.

The SIM card 924 may be inserted into a slot formed at a certain location in the electronic device. The SIM card 924 may contain therein an integrated circuit card identifier (ICCID) or an international mobile subscriber identity (IMSI).

The memory 930 (e.g., the memory 130) may include an internal memory 932 and an external memory 934. The Internal memory 932 may include, for example, at least one of a volatile memory (e.g., dynamic random access memory (DRAM), static RAM (SRAM), synchronous DRAM (SDRAM) etc.) or a nonvolatile memory (e.g., one-time programmable read only memory (OTPROM), programmable ROM (PROM), erasable PROM (EPROM), electrically erasable PROM (EEPROM), mask ROM, flash ROM, NAND flash memory, NOR flash memory, etc.).

According to an embodiment of the present disclosure, the internal memory 932 may have the form of a solid state drive (SSD). The external memory 934 may include a flash drive, e.g., a compact flash (CF) drive, a secure digital (SD) drive, a micro SD (Micro-SD) drive, a mini SD (Mini-SD) drive, an extreme digital (xD) drive, a memory stick, or the like. The external memory 934 may be functionally connected to the electronic device 901 through various interfaces. According to an embodiment of the present disclosure, the electronic device 901 may further include a storage device or medium such as a hard drive.

The sensor module 940 may measure a physical quantity or sense an operating status of the electronic device 901, and then convert measured or sensed information into electrical signals. The sensor module 940 may include, for example, at least one of a gesture sensor 940A, a gyro sensor 940B, an atmospheric sensor 940C, a magnetic sensor 940D, an acceleration sensor 940E, a grip sensor 940F, a proximity sensor 940G, a color sensor 940H (e.g., a red-blue-green (RGB) sensor), a biometric sensor 940I, a temperature-humidity sensor 940J, an illumination sensor 940K, and an ultraviolet (UV) light sensor 940M. Additionally or alternatively, the sensor module 940 may include, e.g., an electronic nose (E-nose) sensor, an electromyography (EMG) sensor, an electroencephalogram (EEG) sensor, an electrocardiogram (ECG) sensor, an infrared (IR) sensor, an iris scan sensor, or a finger scan sensor. Also, the sensor module 940 may include a control circuit for controlling one or more sensors equipped therein.

The input unit 950 may include a touch panel 952, a digital pen sensor 954, a key 956, or an ultrasonic input unit 958. The touch panel 952 may recognize a touch input in a manner of a touch panel of a capacitive type, a resistive type, an infrared type, or an ultrasonic type. Also, the touch panel 952 may further include a control circuit. In the case of a capacitive type touch panel, a physical contact or proximal contact may be recognized. The touch panel 952 may further include a tactile layer. In this case, the touch panel 952 may provide a tactile feedback to a user.

The digital pen sensor 954 may be formed in the same or similar manner as receiving a touch input or by using a separate recognition sheet. The key 956 may include, for example, a physical button, an optical key, or a keypad. The ultrasonic input unit 958 is a certain device capable of identifying data by sensing sound waves with a microphone 988 in the electronic device 901 through an input tool that generates ultrasonic signals, thus allowing wireless recognition. According to an embodiment of the present disclosure, the electronic device 901 may receive a user input from any external device (e.g., a computer or a server) connected thereto through the communication module 920.

The display 960 (e.g., the display 150) may include a panel 962, a hologram 964, or a projector 966. The panel 962 may be, for example, a liquid crystal display (LCD), an active matrix organic light emitting diode (AM-OLED) panel, or the like. The panel 962 may have a flexible, transparent or wearable form. The panel 962 may be formed of a single module with the touch panel 952. The hologram 964 may provide a stereoscopic image in the air using the interference of light. The projector 966 may project an image onto a screen, which may be located internal or external to the electronic device 901. According to an embodiment of the present disclosure, the display 960 may further include a control circuit for controlling the panel 962, the hologram 964, and the projector 966.

The Interface 970 may include, for example, a high-definition multimedia interface (HDMI) 972, a universal serial bus (USB) 974, an optical interface 976, or a D-subminiature (D-sub) connector 978. The interface 970 may be contained, for example, in the communication interface 160 of FIG. 1. Additionally or alternatively, the interface 970 may include, for example, a mobile high-definition link (MHL) interface, an SD card/multi-media card (MMC) interface, or an Infrared Data Association (IrDA) interface.

The audio module 980 may convert a sound to an electrical signal, and vice versa. At least part of the audio module 980 may be contained, for example, in the input/output interface 140 of FIG. 1. The audio module 980 may process sound information input or output through a speaker 982, a receiver 984, an earphone 986, or a microphone 988.

The camera module 991 is a device capable of obtaining still images and moving images. According to an embodiment of the present disclosure, the camera module 991 may include at least one image sensor (e.g., a front sensor or a rear sensor), a lens, an image signal processor (ISP), or a flash (e.g., light emitting diode (LED) or xenon lamp).

The power management module 995 may manage electrical power of the electronic device 901. The power management module 995 may include, for example, a PMIC, a charger IC, or a battery gauge.

The PMIC may be formed, for example, of an IC chip or an SoC. Charging may be performed in a wired or wireless manner. The charger IC may charge a battery 996 and prevent overvoltage or overcurrent from a charger. According to an embodiment of the present disclosure, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 996 and a voltage, current or temperature in a charging process. The battery 996 may store or create electrical power therein and supply electrical power to the electronic device 901. The battery 996 may be, for example, a rechargeable battery or a solar battery.

The indicator 997 may show thereon a current status (e.g., a booting status, a message status, or a recharging status) of the electronic device 901 or of its part (e.g., the AP 910). The motor 998 may convert an electrical signal into a mechanical vibration. The electronic device 901 may include a certain processor (e.g., GPU) for supporting a mobile TV. This processor may process media data that comply with standards of digital multimedia broadcasting (DMB), digital video broadcasting (DVB), or media flow.

Each of the above described elements of the electronic device according to an embodiment of the present disclosure may be formed by one or more components, and the names of the corresponding elements may vary according to the type of the electronic device. The electronic device according to an embodiment of the present disclosure may include at least one of the above described elements, and may exclude some of the elements or further include other additional elements. Further, some of the elements of the electronic device according to an embodiment of the present disclosure may be coupled to form a single entity while performing the same functions as those of the corresponding elements before the coupling.

As described above, according to an embodiment of the present disclosure, the battery of an electronic device can be charged or recent software of an electronic device can be updated, without opening the packaging of the electronic device.

According to an embodiment of the present disclosure, only when an update is required, electronic devices can be booted in a management mode to update the software.

According to an embodiment of the present disclosure, when an electronic device receives a power supply command directly entered by a user's input, the management booting system related to a management mode is deleted, so that the wireless control unavailable to the electronic device can be restricted.

According to an embodiment of the present disclosure, sales or inventory of electronic devices can be managed based on information received from electronic devices.

The present disclosure and the accompanying drawings are to be regarded in an illustrative rather than a restrictive sense in order to help understand the present disclosure. Thus the scope of the present disclosure should be determined by the appended claims and their equivalents rather than the present disclosure, and various alterations and modifications of the present disclosure are included within the scope of the present disclosure, as defined by the appended claims and their equivalents.

What is claimed is:

1. An electronic device comprising:
    a wireless charging module; and
    a processor configured to:
        receive, through the wireless charging module, a request signal from a wireless control device;
        transmit, through the wireless charging module, a response signal to the wireless control device in response to the request signal, wherein the response signal comprises an update start signal;
        turn off power to the electronic device in response to determining that the update start signal is not received from the wireless control device in a preset period of time; and
        update system software of the electronic device in response to determining that the update start signal is received from the wireless control device in the preset period of time.

2. The electronic device of claim 1, wherein the processor is further configured to:
    receive, in response to determining that a remaining battery capacity is less than a threshold, a charging signal from the wireless control device through the wireless charging module; and
    control the wireless charging module to charge a battery of the electronic device by using the charging signal.

3. The electronic device of claim 1, further comprising:
a memory configured to store the device information containing at least one of an identification code, a model name, a system version, and hardware information, which are related to the electronic device,
wherein the processor is further configured to boot the electronic device in a management mode by using a management booting system, and extract the device information stored in the memory.

4. The electronic device of claim 3, wherein the processor is further configured to:
receive, through the wireless charging module, a system update file according to the device information from the wireless control device; and
update the system software by using the system update file.

5. The electronic device of claim 3, further comprising:
a communication module,
wherein the processor is further configured to:
receive, through the wireless charging module, a management mode booting signal from the wireless control device in response to the request signal;
transmit, through the communication module, the device information to a server using the management mode booting signal;
receive, through the communication module, a system update file according to the device information from the server; and
update the system software by the system update file.

6. The electronic device of claim 3, wherein the processor is further configured to delete the management booting system in response to determining that a command for supplying power is received from a user interface module of the electronic device.

7. The electronic device of claim 1, wherein the response signal comprises at least one of a device identifier for identifying the electronic device, a remaining battery capacity of the electronic device and status information of the electronic device.

8. A wireless control method of an electronic device, comprising:
receiving a request signal from a wireless control device;
transmitting a response signal to the wireless control device in response to the request signal, the response signal comprising an update start signal;
turning off power to the electronic device in response to determining that the update start signal is not received from the wireless control device in a preset period of time; and
updating system software of the electronic device in response to determining that the update start signal is received from the wireless control device in the preset period of time.

9. The method of claim 8, further comprising:
receiving, in response to determining that a remaining battery capacity is less than a threshold, a charging signal from the wireless control device; and
charging a battery of the electronic device by using the charging signal.

10. The method of claim 8, wherein updating system software comprises:
booting, in response to determining that a remaining battery capacity is greater than or equal to the threshold, the electronic device in a management mode by using a management booting system, and extracting the device information, stored in a memory, containing at least one of an identification code, a model name, a system version, and hardware information, which are related to the electronic device.

11. The method of claim 10, wherein updating the system software comprises:
receiving a system update file according to the device information from the wireless control device; and
updating the system software.

* * * * *